(12) United States Patent
Hiratsuka et al.

(10) Patent No.: US 7,239,583 B2
(45) Date of Patent: Jul. 3, 2007

(54) TRACKING ERROR DETECTION APPARATUS

(75) Inventors: Takashige Hiratsuka, Saijo (JP); Yoshihiro Kanda, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 561 days.

(21) Appl. No.: 10/809,486

(22) Filed: Mar. 26, 2004

(65) Prior Publication Data

US 2004/0220781 A1 Nov. 4, 2004

(30) Foreign Application Priority Data

Mar. 26, 2003 (JP) .............................. 2003-086369

(51) Int. Cl.
*G11B 7/00* (2006.01)
(52) U.S. Cl. ................................ 369/44.41; 369/44.29; 369/44.34
(58) Field of Classification Search ............. 369/44.27, 369/44.28, 44.29, 44.26, 44.41, 44.42, 44.34, 369/47.27, 47.28
See application file for complete search history.

(56) References Cited

U.S. PATENT DOCUMENTS 7,012,862 B2 * 3/2006 Hiratsuka ................ 369/44.34

FOREIGN PATENT DOCUMENTS

| JP | 63-181126 | 7/1988 |
|----|-----------|--------|
| JP | 8-147724 | 6/1996 |
| JP | 10-308025 | 11/1998 |
| JP | 2001-67690 | 3/2001 |
| JP | 2001-243643 | 9/2001 |
| KR | 1999-0052619 | 7/1999 |

* cited by examiner

*Primary Examiner*—Nabil Hindi
(74) *Attorney, Agent, or Firm*—Wenderoth, Lind & Ponack, L.L.P.

(57) ABSTRACT

A tracking error detection apparatus comprises a phase difference detection circuit for receiving two sequences of digital signals, and performing phase comparison using a distance between zerocross points of the two sequences of digital signals to output a result of phase comparison, and an LPF for generating a tracking error signal from the result of phase comparison. The phase difference detection circuit does not carry out phase composition in a position that is not appropriate as a target position to perform phase comparison, and outputs the result of phase comparison as a pulse signal corresponding to one sampling clock. Therefore, even when a disc is played at CAV or a flaw or the like exists on the disc, an accurate tracking error signal can be detected.

36 Claims, 24 Drawing Sheets

● : sampling points

No zerocross can be detected

TRACKING ERROR DETECTION APPARATUS

FIELD OF THE INVENTION

The present invention relates to a tracking error detection apparatus for detecting a tracking error of a light spot that is obtained by irradiating an optical recording medium with a light beam.

BACKGROUND OF THE INVENTION

In recent years, a technique called "phase difference method" has been employed as a method for obtaining a tracking control signal from an optical disc on which information is recorded by projecting and depressing pits, such as a CD (Compact Disc) or a DVD (Digital Video Disc).

Japanese Published Patent Application No. Hei.2001-67690 discloses an example of such phase difference method.

Hereinafter, a conventional tracking error detection apparatus disclosed in Japanese Published Patent Application No. Hei.2001-67690 will be described with reference to FIG. 19.

FIG. 19 is a block diagram illustrating the construction of the conventional tracking error detection apparatus.

As shown in FIG. 19, the conventional tracking error detection apparatus is provided with a photodetector 101 having photoreceptor elements 101a, 101b, 101c, and 101d that receive a reflected light beam from a light spot, and outputting photo currents according to the amounts of light received by the respective photoreceptor elements; first to fourth current-to-voltage converter 102a to 102d for converting the photo currents outputted from the photodetector 101 into voltage signals; signal generators, i.e., first and second adders 103a and 103b, for generating two signal sequences whose phases change depending on a tracking error of the light spot, from the voltage signals obtained by the first to fourth current-to-voltage converter 102a to 102d; first and second analog-to-digital converters (ADC) 104a and 104b for obtaining first and second digital signal sequences from the two signal sequences; first and second interpolation filters 105a and 105b for subjecting the inputted digital signals to interpolation; first and second zero cross point detection circuits 106a and 106b for detecting zero cross points of the first and second digital signal sequences which are interpolated by the first and second interpolation filters 105a and 105b, respectively; a phase difference detection circuit 107 for detecting a phase difference between the zero cross point of the first digital signal sequence and the zero cross point of the second digital signal sequence; and a low-pass filter (LPF) 108 for subjecting a phase comparison signal outputted from the phase difference detection circuit 107 to band restriction to obtain a tracking error signal. The photodetector 101 comprises the four photodetector elements 101a, 101b, 101c, and 101d that are partitioned in a tangential direction and a perpendicular direction with respect to an information track that is recorded as an information pit line on the recording medium. Among the signals which are generated according to the amounts of light received by the respective photoreceptor elements and are outputted from the photodetector 101, the output signals from the photoreceptor elements positioned on a diagonal line are added by each of the first and second adders 103a and 103b, thereby generating two sequences of digital signals. Further, a zerocross point is a point where an inputted digital signal intersects a center level of the digital signal that is calculated from an average value or the like of the digital signal.

Next, the operation of the conventional tracking error detection apparatus will be described.

Initially, in the photodetector 101, the respective photoreceptor elements 101a, 101b, 101c, and 101d receive a reflected light beam from a light spot that is obtained by irradiating a track on an optical recording medium (not shown) with a light beam, and output photo currents according to the amounts of received light.

The photo currents outputted from the respective photoreceptor elements of the photodetector 101 are converted into voltage signals by the first to fourth current-to-voltage conversion circuits 102a, 102b, 102c, and 102d, and the first adder 103a adds the outputs of the first and third current-to-voltage circuits 102a and 102c while the second adder 103b adds the outputs of the second and fourth current-to-voltage circuits 102b and 102d.

Then, the signals outputted from the first and second adders 103a and 103b are subjected to sampling by the first and second ADCs 104a and 104b to be converted into first and second digital signal sequences, respectively.

Then, the digital signals outputted from the first and second ADCs 104a and 104b are input to the interpolation filters 105a and 105b to obtain interpolation data between the sampling data of the digital signals. Thereafter, zerocross points at the rising edges or falling edges of the two interpolated data sequences are detected by the zerocross point detection circuits 106a and 106b, respectively. For example, as a method of interpolation, "Nyquist interpolation" may be employed. As a method of detecting zerocross points at the rising or falling edges of two data sequences, change points of signs (+→− or −→+) in the interpolated data sequences may be obtained.

In the phase error detection circuit 107, a distance between the zerocross points in the waveforms of the first and second signal sequences is obtained using information of the zerocross points outputted from the zerocross point detection circuits 106a and 106b, and a phase comparison signal is detected on the basis of the distance between the zerocross points, and finally, band restriction is carried out by the LPF 108 to generate a tracking error signal of a frequency band that is required for tracking servo control.

Next, the construction and operation of the conventional phase difference detection circuit 107 will be described in more detail with reference to FIGS. 20 and 21.

FIG. 20 is a block diagram illustrating the construction of the conventional phase error detection circuit 107.

In FIG. 20, the phase difference detection circuit 107 comprises a phase difference calculation unit 201, a pulse generation unit 202, and a data updation unit 203.

The phase difference calculation unit 201 calculates a distance between the zerocross points of the two sequences of digital signals on the basis of the zerocross information detected by the zerocross point detection circuits 106a and 106b, and successively outputs it as a result of phase comparison to the data updation unit 203.

The pulse generation unit 202 generates pulse signals each corresponding to one sampling clock at the zerocross positions in the respective data sequences to be used for phase comparison, and outputs a pulse signal that appears later at the point where phase comparison is carried out, as a phase comparison end pulse, between the generated pulse signals corresponding to the respective data sequences.

The data updation unit 203 updates the output data for every phase comparison end pulse outputted from the pulse generation unit 202, using the phase comparison results that are successively outputted from the phase difference calculation unit 201, and maintains the output level of the output data until the next phase comparison end pulse arrives.

FIG. 21 is a diagram for explaining the operation of the phase difference detection circuit 107. FIG. 21 shows, from top to bottom, a first signal sequence outputted from the first zerocross point detection circuit 106a (phase comparison input A), a second signal sequence outputted from the second zerocross point detection circuit 106b (phase comparison input B), a phase comparison end pulse outputted from the pulse generation unit 202, and a phase comparison output from the phase difference detection circuit 11.

With reference to the phase comparison inputs A and B shown in FIG. 21, ○ indicates sampling data obtained by the first or second ADC 104a or 104b, Δ indicates interpolation data sequences obtained by the first or second interpolation filters 105a or 105b, and ● and ▲ indicate zerocross points obtained from the sampling data sequences and the interpolation data sequences. Further, the phase comparison signal shown in FIG. 21 is obtained with respect to a vicinity of a specific track, and it is obtained at the falling edges of the two data sequences whose phase difference should be obtained. Further, the number of interpolation data is 3 (n=3).

When the outputs from the zerocross point detection circuits 106a and 106b are input to the phase difference detection circuit 107, the phase difference calculation unit 201 calculates a distance between the zerocross points detected by the zerocross point detection circuits 106a and 106b. Then, the pulse generation unit 202 generates a pulse signal corresponding to one sampling clock at a position where each of the data sequences (the phase comparison inputs A and B) to be used for phase comparison performs zerocross, and outputs a pulse signal that appears later between the generated pulse signals corresponding to the respective data sequences, as a phase comparison end pulse (refer to the phase comparison end pulse shown in FIG. 21).

Then, the data updation unit 203 performs updation of the output data using the phase comparison result outputted from the phase difference calculation unit 201, for every phase comparison end pulse outputted from the pulse generator 202, and maintains the output level of the output data until the next phase comparison end pulse arrives (refer to the phase comparison output shown in FIG. 21).

Thereby, the phase difference detection circuit 107 detects a phase comparison signal as shown by the phase comparison output in FIG. 21, and the tracking error signal obtained by performing band restriction to the phase comparison signal becomes an approximately straight signal when paying attention to a vicinity of a specific track. Then, the tracking error signal is observed over plural tracks, thereby obtaining, as a whole, an approximately sinusoidal waveform that is repeated for every track as shown in FIG. 22.

As described above, since the conventional tracking error detection apparatus can detect a tracking error by digital signal processing, it can deal with speedup of an optical recording/playback apparatus and an increase in recording density on a recording medium, which cannot be achieved by tracking error detection using analog signal processing. Furthermore, the constituents relating to analog signal processing can be significantly reduced, thereby realizing small-sized and low-cost optical recording/playback apparatus.

In the above-mentioned conventional tracking error detection apparatus, however, since AD conversion by the first and second ADCs 104a and 104b is carried out with the sampling rate being fixed, the amplitude of the obtained tracking error signal varies between the inner track and the outer track of the disc during CAV playback.

That is, since the channel rate is low at the inner track while it is high at the outer track during CAV playback, when the first and second ADCs 104a and 104b performs AD conversion with the sampling rate being fixed, the number of sampling data to be sampled within the same phase interval becomes larger at the inner track than at the outer track, resulting in a variation in the amplitudes of the tracking error signals obtained at the inner track and the outer track on the disc.

FIGS. 23(a) and 23(b) show tracking error signals detected by the conventional tracking error detection apparatus during CAV playback. To be specific, FIG. 23(a) shows a tracking error signal at the inner track of the disc while FIG. 23(b) shows a tracking error signal at the outer track of the disc.

As shown in FIG. 23(a), at the inner track, the number of sampling data to be sampled within the same phase interval increases, and therefore, the phase difference detected as the distance between the zerocross points by the phase difference detection circuit 107 increases, resulting in an increase in the output amplitude of the tracking error signal. On the other hand, at the outer track, as shown in FIG. 23(b), the number of sampling data to be sampled within the same phase interval is small, and therefore, the phase difference detected as the distance between the zerocross points by the phase difference detection circuit 107 becomes small, resulting in a reduction in the output amplitude of the tracking error signal.

Further, in the above-mentioned conventional tracking error detection apparatus, in order to realize a small-size and low-cost optical recording/playback apparatus, bit resolution of the first and second ADCs 104a and 104b possessed by the conventional tracking error detection apparatus is set at a minimum bit resolution required for phase comparison. Therefore, when the amplitude of the analog signal to be input to the first and second ADCs 104a and 104b is not sufficiently obtained due to defect or the like, sampling is not correctly carried out by the first and second ADCs 104a and 104b, leading to false detection of the phase difference detection circuit 107.

Further, in the conventional tracking error detection apparatus, when the voltage level of the analog signal to be input to the first and second ADCs 104a and 104b varies due to defect or the like, the zerocross point detection circuits 106a and 106b cannot correctly detect zerocross points, and the phase difference detection circuit 107 cannot detect a phase difference.

SUMMARY OF THE INVENTION

The present invention is made to solve the above-described problems and has for its object to provide a tracking error detection apparatus that can correctly detect a tracking error signal even when a disc is played at CAV, or a flaw or the like exists on the disc to be played.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a tracking error detection apparatus comprises: a photodetector comprising four photoreceptor elements which are partitioned along a tangential direction and a perpendicular direction with respect to an information track that is recorded as an information pit line on a recording medium; zerocross detection circuits for detecting zerocross points at which two sequences of digital signals intersect center levels of the respective digital signals, each of said two sequences of digital signals being obtained by adding output signals from the two photoreceptor elements positioned on a diagonal line, among four signals that are generated according to the amounts of light received by the respective photoreceptor elements and are outputted from the photodetector; a phase difference detection circuit for performing phase comparison using a distance between the zerocross points of the two sequences of digital signals, and outputting a result of phase comparison obtained between the respective zerocross points, as a pulse signal corresponding to one sampling clock; and a low-pass filter for performing band restriction to a signal outputted from the phase difference detection circuit, thereby to obtain a tracking error signal. Therefore, even when performing CAV playback in which the channel rate at the outer track differs from that at the inner track, the amplitude of the tracking error signal does not vary between at the outer track and at the inner track, thereby resolving dependence of the tracking error signal on the linear velocity during CAV playback.

According to a second aspect of the present invention, in the tracking error detection apparatus according to the first aspect, the phase difference detection circuit comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; and a data switching unit for outputting each of the results of phase comparison between the respective zerocross points, which have been successively outputted from the phase difference calculation unit, as a pulse signal corresponding to one sampling clock, at the timing of the phase comparison end pulse outputted from the pulse generation unit.

According to a third aspect of the present invention, a tracking error detection apparatus comprises: a photodetector comprising four photoreceptor elements which are partitioned along a tangential direction and a perpendicular direction with respect to an information track that is recorded as an information pit line on a recording medium; zerocross detection circuits for detecting zerocross points at which two sequences of digital signals intersect center levels of the respective digital signals, each of said two sequences of digital signals being obtained by adding output signals from the two photoreceptor elements positioned on a diagonal line, among four signals that are generated according to the amounts of light received by the respective photoreceptor elements and are outputted from the photodetector; a pulse width detection circuit for detecting a pulse width of sampling data of the two sequences of digital signals; a phase difference detection circuit for performing phase comparison using the distance between the zerocross points of the two sequences of digital signals, and outputting a result of phase comparison; and a low-pass filter for performing band restriction to a signal outputted from the phase difference detection circuit, thereby to obtain a tracking error signal; wherein, when the pulse width detected by the pulse width detection circuit is equal to or shorter than a predetermined value, said phase difference detection circuit does not perform phase comparison at this pulse. Therefore, even when no sufficient signal amplitude is obtained by the photodetector due to a defect or the like, an accurate tracking error signal can be obtained.

According to a fourth aspect of the present invention, in the tracking error detection apparatus according to a third aspect, the phase difference detection circuit comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; an invalid pulse cancel unit for, when the pulse width detected by the pulse width detection circuit is equal to or shorter than a predetermined value, treating the corresponding pulse as an invalid pulse, and canceling phase comparison at this invalid pulse in the phase difference calculation unit; and a data updation unit for updating the output data using the result of phase comparison that is successively outputted from the phase difference calculation unit, at every phase comparison end pulse outputted from the pulse generation unit, and maintaining the output level of the output data until the next phase comparison end pulse arrives.

According to a fifth aspect of the present invention, in the tracking error detection apparatus according to the third aspect, the phase difference detection circuit comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; an invalid pulse cancel unit for, when the pulse width detected by the pulse width detection circuit is equal to or shorter than a predetermined value, treating the corresponding pulse as an invalid pulse, and canceling phase comparison at this invalid pulse in the phase difference calculation unit; and a data updation unit for updating the output data using the result of phase comparison that is successively outputted from the phase difference calculation unit for every phase comparison end pulse outputted from the pulse generation unit, and maintaining the output level of the output data until the next phase comparison end pulse arrives, and updating the output data using the average of the plural results of phase difference comparison that are obtained in the phase difference calculation unit before and/or after the invalid pulse, at the timing of the invalid pulse, when receiving a signal from the invalid pulse cancel unit indicating that the invalid pulse is canceled in the phase difference calculation unit.

According to a sixth aspect of the present invention, in the tracking error detection apparatus according to the third aspect, the phase difference detection circuit comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; an invalid pulse cancel unit for, when the pulse width detected by the pulse width detection circuit is equal to or shorter than a predetermined value, treating the corresponding pulse as an invalid pulse, and canceling phase comparison at this invalid pulse in the phase difference calculation unit; and a data switching unit for outputting each of the results of phase comparison between the respective zerocross points, which have been successively outputted from the phase difference calculation unit, as a pulse signal corresponding to one sampling clock, at the timing of the phase comparison end pulse outputted from the pulse generation unit, and outputting the previous result of phase difference comparison obtained in the phase difference calculation unit, as a pulse signal corresponding to one sampling clock, at the timing of the invalid pulse, when receiving a signal indicating that the invalid pulse is canceled in the phase difference calculation unit.

According to a seventh aspect of the present invention, in the tracking error detection apparatus according to the third aspect, the phase difference detection circuit comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; an invalid pulse cancel unit for, when the pulse width detected by the pulse width detection circuit is equal to or shorter than a predetermined value, treating the corresponding pulse as an invalid pulse, and canceling phase comparison at this invalid pulse in the phase difference calculation unit; and a data switching unit for outputting each of the results of phase comparison between the respective zerocross points, which have been successively outputted from the phase difference calculation unit, as a pulse signal corresponding to one sampling clock, at the timing of the phase comparison end pulse outputted from the pulse generation unit, and outputting the average of the plural results of phase difference comparison obtained before and/or after the invalid pulse in the phase difference calculation unit, as a pulse signal corresponding to one sampling clock, at the timing of the invalid pulse, when receiving a signal from the invalid pulse cancel unit indicating that the invalid pulse is canceled in the phase difference calculation unit.

According to an eighth aspect of the present invention, in the tracking error detection apparatus according to any of the fourth to seventh aspects, when an H-side pulse width and/or an L-side pulse width, which are detected by the pulse width detection circuit, are/is equal to or shorter than a predetermined value, said invalid pulse cancel unit treats the corresponding pulse as an invalid pulse, and cancels phase comparison with this invalid pulse in the phase difference calculation unit.

According to a ninth aspect of the present invention, the tracking error detection apparatus according to any of the fourth to seventh aspects further comprises an amplitude detection circuit for detecting envelope signals of the two sequences of digital signals, and operating the invalid pulse cancel unit only when the values of the envelope signals are equal to or lower than a predetermined threshold value.

According to a tenth aspect of the present invention, the tracking error detection apparatus according to any of the first to seventh aspects further comprises high-pass filters for removing frequencies equal to and lower than predetermined cutoff frequencies of the two sequences of digital signals.

According to an eleventh aspect of the present invention, a tracking error detection apparatus comprises: a photodetector comprising four photoreceptor elements which are partitioned along a tangential direction and a perpendicular direction with respect to an information track that is recorded as an information pit line on a recording medium; high-pass filters for removing frequencies equal to and lower than predetermined cutoff frequencies of two sequences of digital signals, respectively, said two sequences of digital signals being obtained by adding the output signals from two photoreceptor elements positioned on a diagonal line, among four signals that are generated according to the amounts of light received by the respective photoreceptor elements and are outputted from the photodetector; zerocross detection circuits for detecting zerocross points at which the two sequences of digital signals intersect center levels of the respective digital signals, from the two sequences of digital signals in which the frequencies equal to and lower than the predetermined cutoff frequencies are removed; a phase difference detection circuit for performing phase comparison using a distance between the zerocross points of the two sequences of digital signals, and outputting a result of phase comparison; and a low-pass filter for performing band restriction to a signal outputted from the phase difference detection circuit, thereby to obtain a tracking error signal. Therefore, even when the voltage level varies due to a defect or the like, the zerocross detection circuit can correctly detect zerocross points, thereby producing an accurate tracking error signal.

According to a twelfth aspect of the present invention, a tracking error detection apparatus comprises: a photodetector comprising four photoreceptor element which are partitioned along a tangential direction and a perpendicular direction with respect to an information track that is recorded as an information pit line on a recording medium; zerocross detection circuits for detecting zerocross points at which four sequences of digital signals intersect center levels of the respective digital signals, said four sequences of digital signals being generated according to the amounts of light received by the respective photoreceptor elements and are outputted from the photodetector; a first phase difference detection circuit for performing phase comparison using a distance between the zerocross points of two sequences of digital signals that are obtained from the photoreceptor elements positioned forward in the advancing direction of the information track, among the zerocross points of the four sequences of digital signals, and outputting a result of phase comparison between the zerocross point, as a pulse signal corresponding to one sampling clock; a second phase difference detection circuit for performing phase comparison using a distance between the zerocross points of two sequences of digital signals that are obtained from the photoreceptor elements positioned backward in the advancing direction of the information track, among the zerocross points of the four sequences of digital signals, and outputting the result of phase comparison between the zerocross points as a pulse signal corresponding to one sampling clock; an addition circuit for adding the output signals of the first and second phase different detection circuits; and a low-pass filter for performing band restriction to a signal outputted from the addition circuit, thereby to obtain a tracking error signal. Therefore, even when performing CAV playback in which the channel rate at the outer track differs from that at the inner track, the amplitude of the tracking error signal does not vary between at the outer track and at the inner track, thereby resolving dependence of the tracking error signal on the linear velocity during CAV playback. Further, no offset that depends on the depth of the pit carved in the disc occurs, thereby producing an accurate tracking error signal.

According to a thirteenth aspect of the present invention, in the tracking error detection apparatus according to the twelfth aspect, each of the first and second phase difference detection circuits comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; and a data switching unit for outputting each of the results of phase comparison between the zerocross points, which have been successively outputted from the phase difference calculation unit, as a pulse signal corresponding to one sampling clock, at the timing of the phase comparison end pulse outputted from the pulse generation unit.

According to a fourteenth aspect of the present invention, a tracking error detection apparatus comprises: a photodetector comprising four photoreceptor elements which are partitioned along a tangential direction and a perpendicular direction with respect to an information track that is recorded as an information pit line on a recording medium; zerocross detection circuits for detecting zerocross points at which four sequences of digital signals intersect center levels of the respective digital signals, said four sequences of digital signals being generated according to the amounts of light received by the respective photoreceptor elements and are outputted from the photodetector; a first pulse width detection circuit for detecting pulse widths of sampling data of two sequences of digital signals that are obtained from the photoreceptor elements placed forward in the advancing direction of the information track, among the four sequences of digital signals; a second pulse width detection circuit for detecting pulse widths of sampling data of two sequences of digital signals that are obtained from the photoreceptor elements placed backward in the advancing direction of the information track, among the four sequences of digital signals; a first phase difference detection circuit for performing phase comparison using a distance between the zerocross points of the two sequences of digital signals that are obtained from the photoreceptor elements positioned forward in the advancing direction of the information track, among the zerocross points of the four sequences of digital signals, and outputting the result of phase comparison between the zerocross points, as a pulse signal corresponding to one sampling clock; a second phase difference detection circuit for performing phase comparison using a distance between the zerocross points of the two sequences of digital signals that are obtained from the photoreceptor elements positioned backward in the advancing direction of the information track, among the zerocross points of the four sequences of digital signals, and outputting the result of phase comparison between the zerocross points, as a pulse signal corresponding to one sampling clock; an addition circuit for adding the output signals of the first and second phase different detection circuits; and a low-pass filter for performing band restriction to a signal outputted from the addition circuit, thereby to obtain a tracking error signal; wherein, when the pulse width detected by the first pulse width detection circuit is equal to or lower than a predetermined value, the first phase difference detection circuit does not perform phase comparison at the detected pulse, and when the pulse width detected by the second pulse width detection circuit is equal to or lower than a predetermined value, the second phase difference detection circuit does not perform phase comparison at the detected pulse. Therefore, even when no sufficient signal amplitude is detected by the photodetector due to a defect or the like, an accurate tracking error signal can be obtained. Further, no offset that depends on the depth of the pit carved on the disc occurs, thereby producing an accurate tracking error signal.

According to a fifteenth aspect of the present invention, in the tracking error detection apparatus according to the fourteenth aspect, each of the first and second phase difference detection circuits comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; an invalid pulse cancel unit for, when the pulse width detected by the first or second pulse width detection circuit is equal to or shorter than a predetermined value, treating the corresponding pulse as an invalid pulse, and canceling phase comparison at this invalid pulse in the phase difference calculation unit; and a data updation unit for updating the output data using the result of phase comparison that is successively outputted from the phase difference calculation unit, at every phase comparison end pulse outputted from the pulse generation unit, and maintaining the output level of the output data until the next phase comparison end pulse arrives.

According to a sixteenth aspect of the present invention, in the tracking error detection apparatus according to the fourteenth aspect, each of the first and second phase difference detection circuits comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; an invalid pulse cancel unit for, when the pulse width detected by the first or second pulse width detection circuit is equal to or shorter than a predetermined value, treating the corresponding pulse as an invalid pulse, and canceling phase comparison at this invalid pulse in the phase difference calculation unit; and a data updation unit for updating the output data using the result of phase comparison that is successively outputted from the phase difference calculation unit for every phase comparison end pulse outputted from the pulse generation unit, and maintaining the output level of the output data until the next phase comparison end pulse arrives, and updating the output data using the average of the plural results of phase difference comparison that are obtained in the phase difference calculation unit before and/or after the invalid pulse, at the timing of the invalid pulse, when receiving a signal from the invalid pulse cancel unit indicating that the invalid pulse is canceled in the phase difference calculation unit.

According to a seventeenth aspect of the present invention, in the tracking error detection apparatus according to the fourteenth aspect, each of the first and second phase difference detection circuits comprises: a phase difference calculation unit for calculating the distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; an invalid pulse cancel unit for, when the pulse width detected by the first or second pulse width detection circuit is equal to or shorter than a predetermined value, treating the corresponding pulse as an invalid pulse, and canceling phase comparison at this invalid pulse in the phase difference calculation unit; and a data switching unit for outputting the result of phase comparison that is successively outputted from the phase difference calculation unit, as a pulse signal corresponding to one sampling clock, at the timing of the phase comparison end pulse outputted from the pulse generation unit, and outputting the previous result of phase difference comparison obtained in the phase difference calculation unit, as a pulse signal corresponding to one sampling clock, at the timing of the invalid pulse, when receiving a signal indicating that the invalid pulse is canceled in the phase difference calculation unit.

According to an eighteenth aspect of the present invention, in the tracking error detection apparatus according to the fourteenth aspect, each of the first and second phase difference detection circuit comprises: a phase difference calculation unit for calculating a distance between the zerocross points of the two sequences of digital signals, and successively outputting the distance as a result of phase comparison; a pulse generation unit for generating pulse signals each corresponding to one sampling clock at positions where the two sequences of digital signals perform zerocross, and outputting, as a phase comparison end pulse, a pulse signal that appears later at a point where phase comparison is carried out, between the generated pulse signals corresponding to the two sequences of digital signals; an invalid pulse cancel unit for, when the pulse width detected by the first or second pulse width detection circuit is equal to or shorter than a predetermined value, treating the corresponding pulse as an invalid pulse, and canceling phase comparison at this invalid pulse in the phase difference calculation unit; and a data switching unit for outputting each of the results of phase comparison between the respective zerocross points, which have been successively outputted from the phase difference calculation unit, as a pulse signal corresponding to one sampling clock, at the timing of the phase comparison end pulse outputted from the pulse generation unit, and outputting the average of the plural results of phase difference comparison which are obtained before and/or after the invalid pulse in the phase difference calculation unit, as a pulse signal corresponding to one sampling clock, at the timing of the invalid pulse, when receiving a signal from the invalid pulse cancel unit indicating that the invalid pulse is canceled in the phase difference calculation unit.

According to a nineteenth aspect of the present invention, in the tracking error detection apparatus according to any of the fifteenth to eighteenth aspects, when an H-side pulse width and/or an L-side pulse width, which are detected by the first or second pulse width detection circuit, are/is equal to or shorter than a predetermined value, said invalid pulse cancel unit treats the corresponding pulse as an invalid pulse, and cancels phase comparison with this invalid pulse in the phase difference calculation unit.

According to a twentieth aspect of the present invention, the tracking error detection apparatus according to any of the fifteenth to eighteenth aspects further comprises: a first amplitude detection circuit for detecting envelope signals of the two sequences of digital signals which are obtained from the photoreceptor elements positioned forward in the advancing direction of the information track, among the four sequences of digital signals, and operating the invalid pulse cancel unit only when the values of the envelope signals are equal to or lower than a predetermined threshold value; and a second amplitude detection circuit for detecting envelope signals of the two sequences of digital signals which are obtained from the photoreceptor elements positioned backward in the advancing direction of the information track, among the four sequences of digital signals, and operating the invalid pulse cancel unit only when the values of the envelope signals are equal to or lower than a predetermined threshold value.

According to a twenty-first aspect of the present invention, the tracking error detection apparatus according to any of the twelfth to eighteenth aspects further comprises high-pass filters for removing frequencies equal to and lower than predetermined cutoff frequencies of the four sequences of digital signals.

According to a twenty-second aspect of the present invention, a tracking error detection apparatus comprises: a photodetector comprising four photoreceptor elements which are partitioned along a tangential direction and a perpendicular direction with respect to an information track that is recorded as an information pit line on a recording medium; high-pass filters for removing frequencies equal to and lower than predetermined cutoff frequencies of four sequences of digital signals obtained according to the amounts of light received by the respective photoreceptor elements and are outputted from the photodetector; zerocross detection circuits for detecting zerocross points at which the four sequences of digital signals intersect center levels of the respective digital signals, from the four sequences of digital signals in which the frequencies equal to and lower than the predetermined cutoff frequencies are removed; a first phase difference detection circuit for performing phase comparison using the distance between the zerocross points of the two sequences of digital signals obtained from the photoreceptor elements positioned forward in the advancing direction of the information track, among the zerocross points of the four sequences of digital signals, and outputting a result of phase comparison; a second phase difference detection circuit for performing phase comparison using the distance between the zerocross points of the two sequences of digital signals obtained from the photoreceptor elements positioned backward in the advancing direction of the information track, among the zerocross points of the four sequences of digital signals, and outputting a result of phase comparison; an addition circuit for adding the output signals from the first and second phase difference detection circuits; and a low-pass filter for performing band restriction to a signal outputted from the phase difference detection circuit, thereby to obtain a tracking error signal. Therefore, even when the voltage level varies due to a defect or the like, the zerocross point detection circuit can correctly detect zerocross points, thereby obtaining an accurate tracking error signal. Further, no offset that depends on the depth of the pit carved on the disc occurs, thereby producing an accurate tracking error signal.

DETAILED DESCRIPTION OF THE PREFERRED EMBODIMENTS

Embodiment 1

Hereinafter, a tracking error detection apparatus according to a first embodiment of the present invention will be described.

Figure 1:
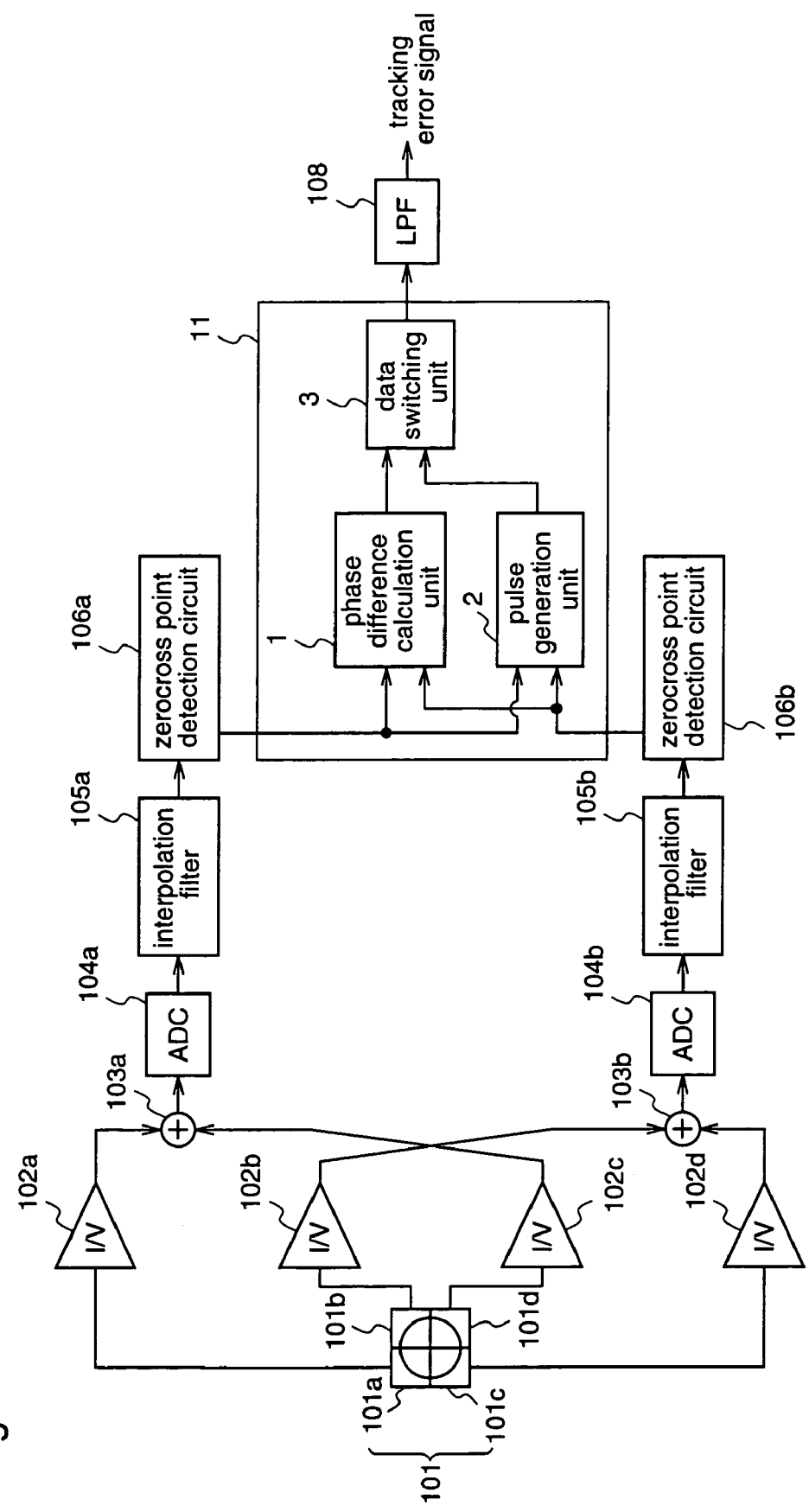
FIG. 1 is a block diagram illustrating an example of a tracking error detection apparatus according to a first embodiment of the present invention.

FIG. 1 is a block diagram illustrating an example of a tracking error detection apparatus according to the first embodiment.

In FIG. 1, the tracking error detection apparatus according to the first embodiment comprises a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zero-cross point detection circuits 106a and 106b, a phase difference detection circuit 11, and a low-pass filter (LPF) 108. Since the constituents of the tracking error detection apparatus according to the first embodiment other than the phase difference detection circuit 11 are identical to those of the conventional tracking error difference detection apparatus described with reference to FIG. 19, repeated description is not necessary.

The phase difference detection circuit 11 comprises a phase difference calculation unit 1, a pulse generation unit 2, and a data switching unit 3.

The phase difference calculation unit 1 calculates a distance between the zerocross points of the two sequences of digital signals on the basis of the zerocross information detected by the zerocross point detection circuits 106a and 106b, and successively outputs the distance as a result of phase comparison to the data switching unit 3.

The pulse generation unit 2 generates a pulse signal corresponding to one sampling clock at a position where zerocross occurs in each data sequence used for phase comparison, and outputs, as a phase comparison end pulse, a pulse signal that appears later at a point where phase comparison is carried out, between the generated pulse signals corresponding to the respective data sequences.

The data switching unit 3 outputs the result of phase comparison obtained by the phase difference calculation unit 1, as a pulse signal corresponding to one sampling clock, at the timing of the phase comparison end pulse outputted from the pulse generation unit 2.

Next, the operation of the phase difference detection circuit 11 will be described.

Figure 2:
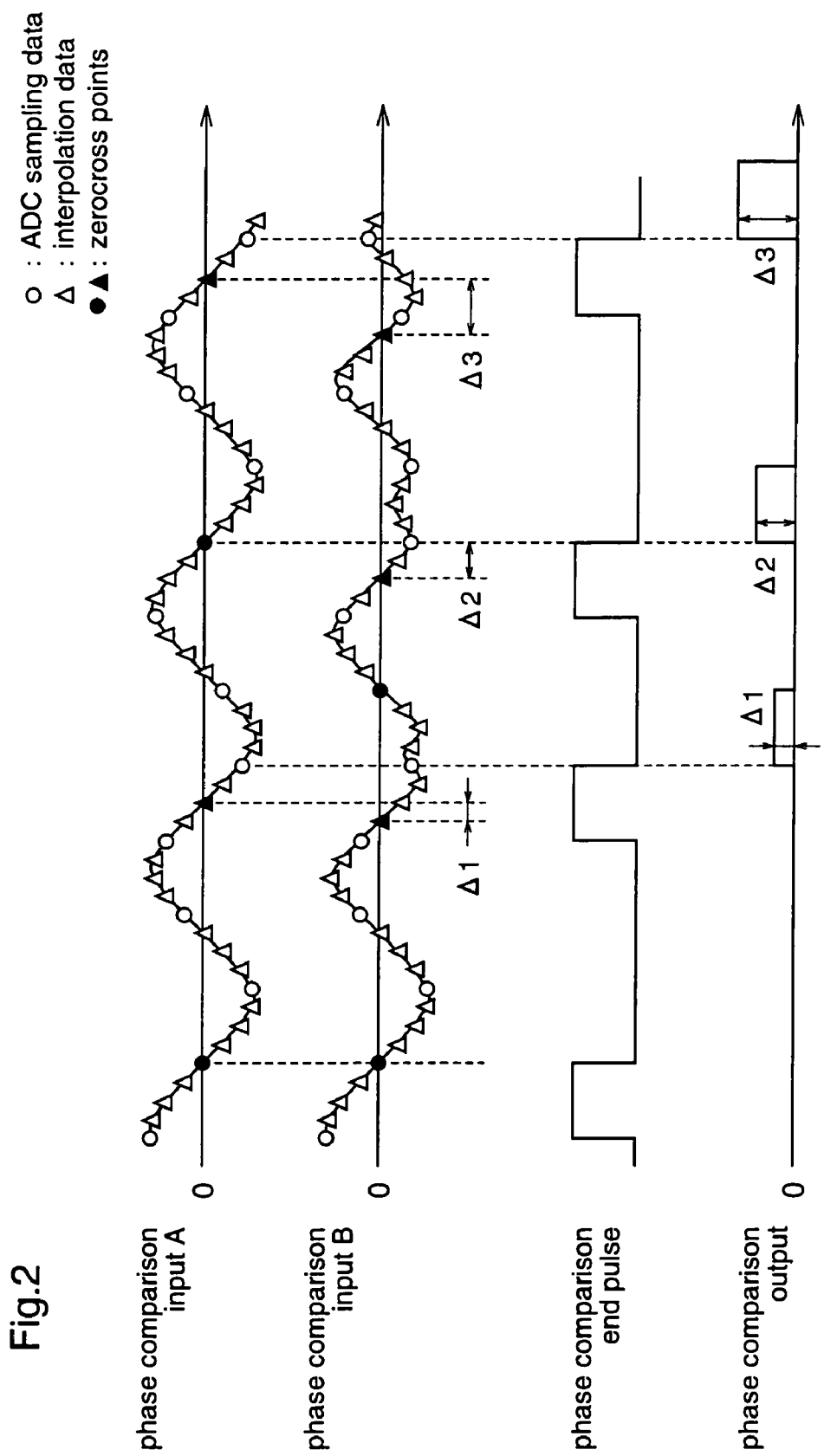
FIG. 2 is a diagram for explaining the operation of a phase difference detection circuit according to the first embodiment.

FIG. 2 is a diagram for explaining the operation of the phase difference detection circuit 11. FIG. 2 shows, from top to bottom, a first signal sequence outputted from the first zerocross point detection circuit 106a (phase comparison input A), a second signal sequence outputted from the second zerocross point detection circuit 106b (phase comparison input B), a phase comparison end pulse outputted from the pulse generation unit 2, and a phase comparison outputted from the phase difference detection circuit 11.

The two signal sequences (the phase comparison inputs A and B shown in FIG. 2) outputted from the first and second zerocross point detection circuits 106a and 106b are input to the phase difference calculation unit 1 and the pulse generation unit 2. In the phase difference calculation unit 1, phase differences $\Delta 1$, $\Delta 2$, and $\Delta 3$ are successively calculated on the basis of the zerocross information detected by the zerocross point detection circuits 106a and 106b. On the other hand, in the pulse generation unit 2, a pulse signal corresponding to one sampling clock is generated at a position where zerocross occurs in each data sequence to be used for phase comparison, and a pulse signal that appears later at a point where phase comparison is carried out, between the generated pulse signals corresponding to the respective data sequences, is output as a phase comparison end pulse (refer to the phase comparison end pulse shown in FIG. 2).

Thereafter, in the data switching unit 3, the phase comparison result obtained in the phase difference calculation unit 1 is output as a pulse signal corresponding to one sampling clock, on the basis of the phase comparison end pulse outputted from the pulse generation unit 2 (refer to the phase comparison output shown in FIG. 2).

The phase comparison output thus generated is finally subjected to band restriction by the LPF 108, thereby generating a tracking error signal of a band required for tracking servo control.

Figure 3A:
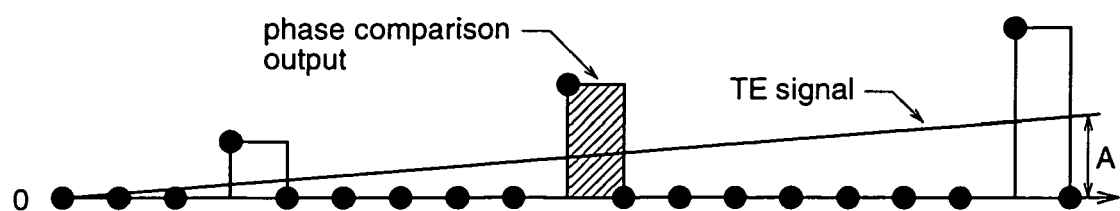
FIG. 3(a) is a diagram illustrating a tracking error signal at inner tracks of a disc, which is detected by the tracking error detection apparatus according to the first embodiment during CAV playback.
Figure 3B:
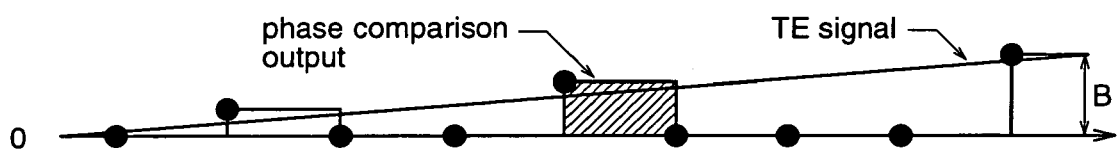
FIG. 3(b) is a diagram illustrating a tracking error signal at outer tracks of a disc, which is detected by the tracking error detection apparatus according to the first embodiment during CAV playback.

FIGS. 3(a) and 3(b) show tracking error signals detected by the tracking error detection apparatus during CAV playback, according to the first embodiment. To be specific, FIG. 3(a) shows a tracking error signal at the inner track of the disc, and FIG. 3(b) shows a tracking error signal at the outer track of the disc.

As shown in FIGS. 3(a) and 3(b), the output amplitude for each pulse of the phase difference detection circuit 11 according to the present invention is larger at the inner track where the number of sampling within a predetermined phase interval is relatively large than at the outer track where the number of sampling within the same phase interval is relatively small. However, since the phase comparison result is output at only one clock, the time required for outputting the phase comparison result is shorter at the inner track than at the outer track.

Therefore, when a tracking error signal is generated by subjecting the phase comparison result outputted from the phase difference detection circuit 11 to band restriction by the LPF 108, the amplitude of the tracking error signal at the inner track becomes equal to that at the outer track (amplitude A and amplitude B in FIG. 3), whereby dependence of the tracking error signal on the linear velocity during CAV playback can be resolved.

As described above, according to the tracking error detection apparatus of the first embodiment, even when CAV playback having different channel rates at the outer track and the inner track is carried out, the amplitude of the tracking error signal does not vary between the inner track and the outer track, whereby dependence of the tracking error signal on the linear velocity during CAV playback can be resolved.

Embodiment 2

Hereinafter, a tracking error detection apparatus according to a second embodiment of the present invention will be described.

Figure 4:
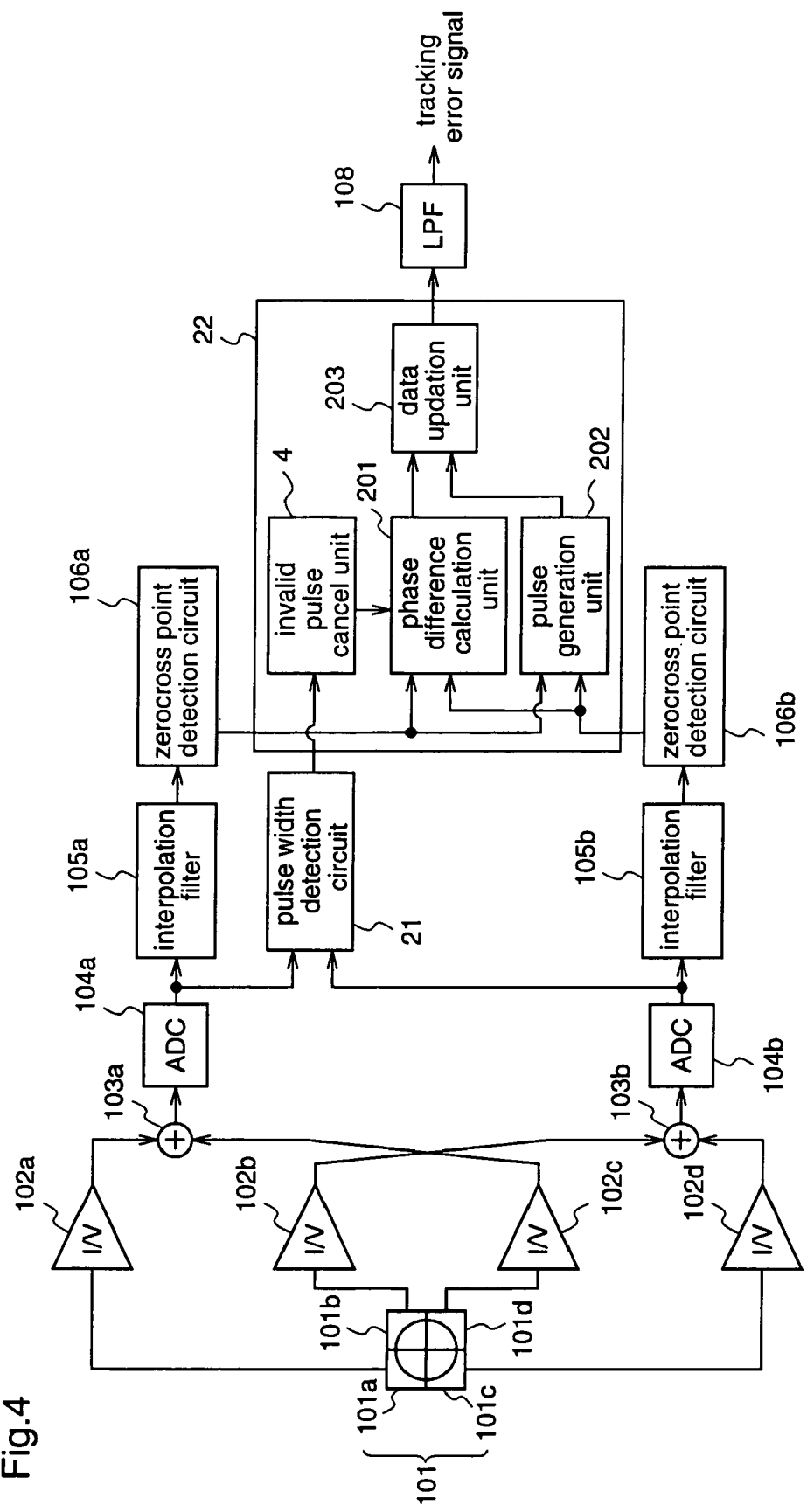
FIG. 4 is a block diagram illustrating a tracking error detection apparatus according to a second embodiment of the present invention.

FIG. 4 is a block diagram illustrating an example of a tracking error detection apparatus according to the second embodiment.

In FIG. 4, the tracking error detection apparatus comprises a photodetector 101, current-to-voltage converters 102a to 102d, first and second adders 103a and 103b, first and second analog-to-digital converters (ADC) 104a and 104b, first and second interpolation filters 105a and 105b, first and second zerocross point detection circuits 106a and 106b, a pulse width detection circuit 21, a phase difference detection circuit 22, and a low-pass filter (LPF) 108. Since the constituents of the tracking error detection apparatus according to the second embodiment other than the pulse width detection circuit 21 and the phase difference detection circuit 22 are identical to those of the conventional tracking error detection apparatus described with reference to FIG. 19, repeated description is not necessary.

The pulse width detection circuit 21 detects the pulse width of sampling data. More specifically, it detects the number of continuous "0" or "1" of each of the digital signals outputted from the first and second ADCs 104*a* and 104*b*.

Figure 20:
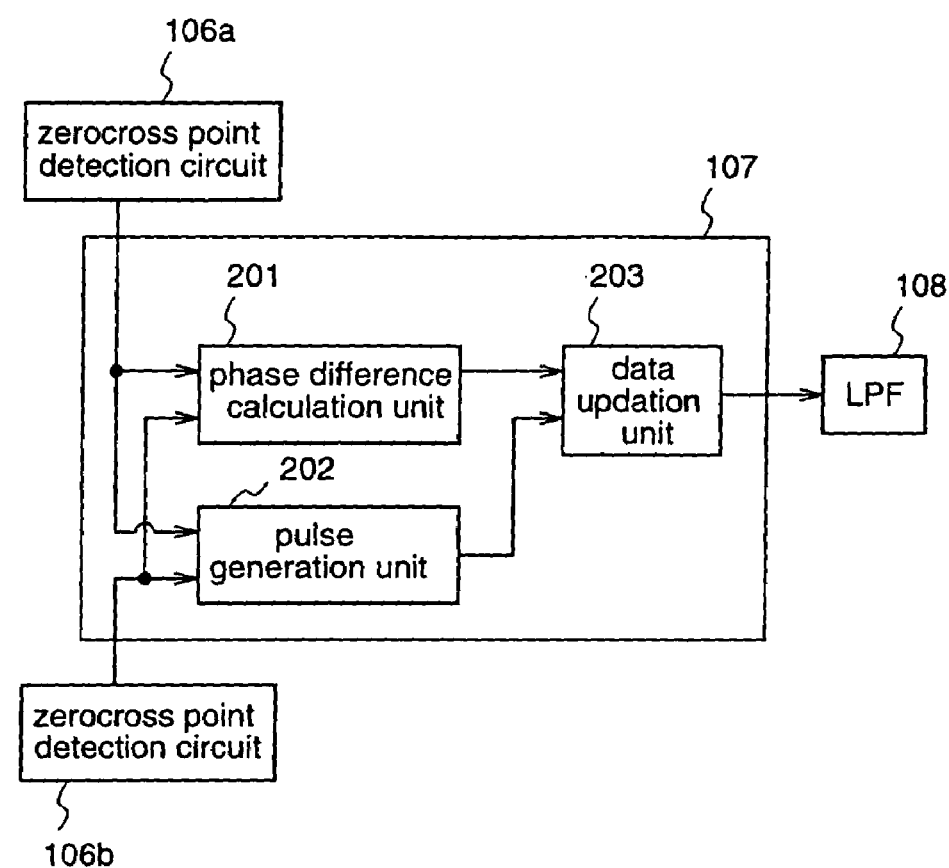
FIG. 20 is a block diagram illustrating a conventional phase difference detection circuit.

The phase difference detection circuit 22 comprises an invalid pulse cancel unit 4, a phase difference calculation unit 201, a pulse generation unit 202, and a data updation unit 203. The phase difference calculation unit 201, the pulse generation unit 202, and the data updation unit 203 constituting the phase difference detection circuit 22 are identical to the phase difference calculation unit 201, the pulse generation unit 202, and the data updation unit 203 constituting the conventional phase difference detection circuit 107 described with reference to FIG. 20, respectively, repeated description is not necessary.

When the H side pulse width detected by the pulse width detection circuit 21 is equal to or smaller than a predetermined value, the invalid pulse cancel unit 4 treats the pulse as an invalid pulse, and the phase difference calculation unit 201 does not perform phase comparison at this pulse. The above-mentioned predetermined value used for judgement as to whether the pulse is an invalid pulse or not may be arbitrarily set. For example, a predetermined value may be previously set, or a value may be changed according to a change in the sampling rate of the first and second ADCs 104*a* and 104*b*.

Next, the operations of the pulse width detection circuit 21 and the phase difference detection circuit 22 will be described.

Figure 5:
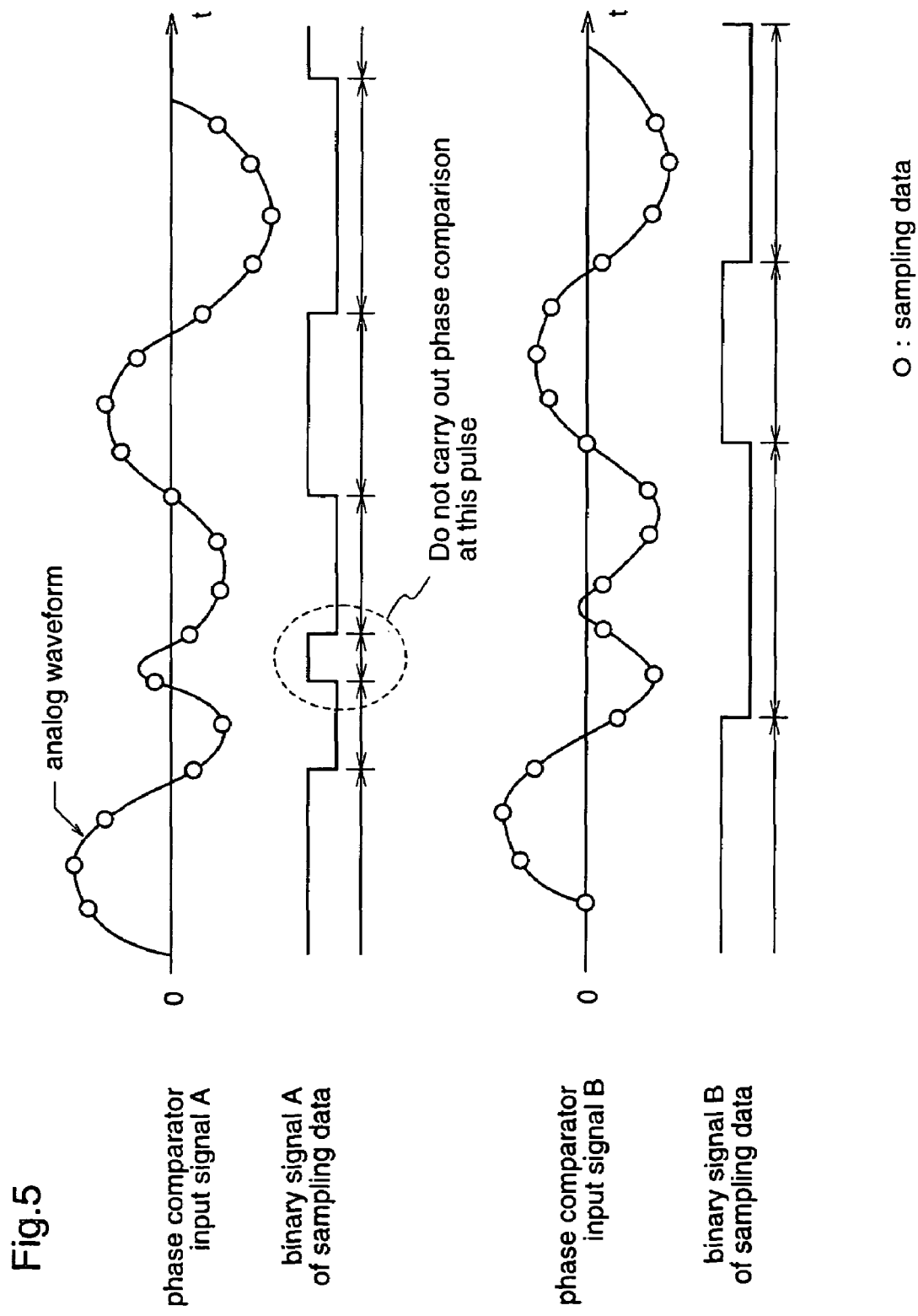
FIG. 5 is a diagram for explaining the operation of an invalid pulse cancel unit according to the second embodiment.

FIG. 5 is a diagram for explaining the operation of the invalid pulse cancel unit 4 according to the second embodiment.

When the amplitude of the analog signal inputted to the first and second ADCs 104*a* and 104*b* is not sufficiently obtained due to a defect or the like, a pulse is generated or not generated at a position where the amplitude of the analog signal is not sufficiently obtained, as shown by the binary signals A and B of the sampling data shown in FIG. 5. When a phase comparison signal is detected by the phase difference detection circuit 22 using the binary signals A and B of the sampling data, the pulse generated in the position where the amplitude of the analog signal is not sufficiently obtained is not correctly sampled, thereby generating a false phase comparison signal.

So, in the tracking error detection apparatus according to the second embodiment, in order to cancel the pulse in the position where the amplitude of the analog signal inputted to the first and second ADCs 104*a* and 104*b* is not sufficiently obtained due to a defect or the like, the pulse width detection circuit 21 detects the pulse width of the sampling data, and the invalid pulse cancel unit 4 of the phase difference detection circuit 22 treats this pulse as an invalid pulse when the H-side pulse width detected by the pulse width detection circuit 21 is equal to or smaller than a predetermined value, and the phase difference calculation unit 201 does not perform phase comparison at this pulse.

Figure 21:
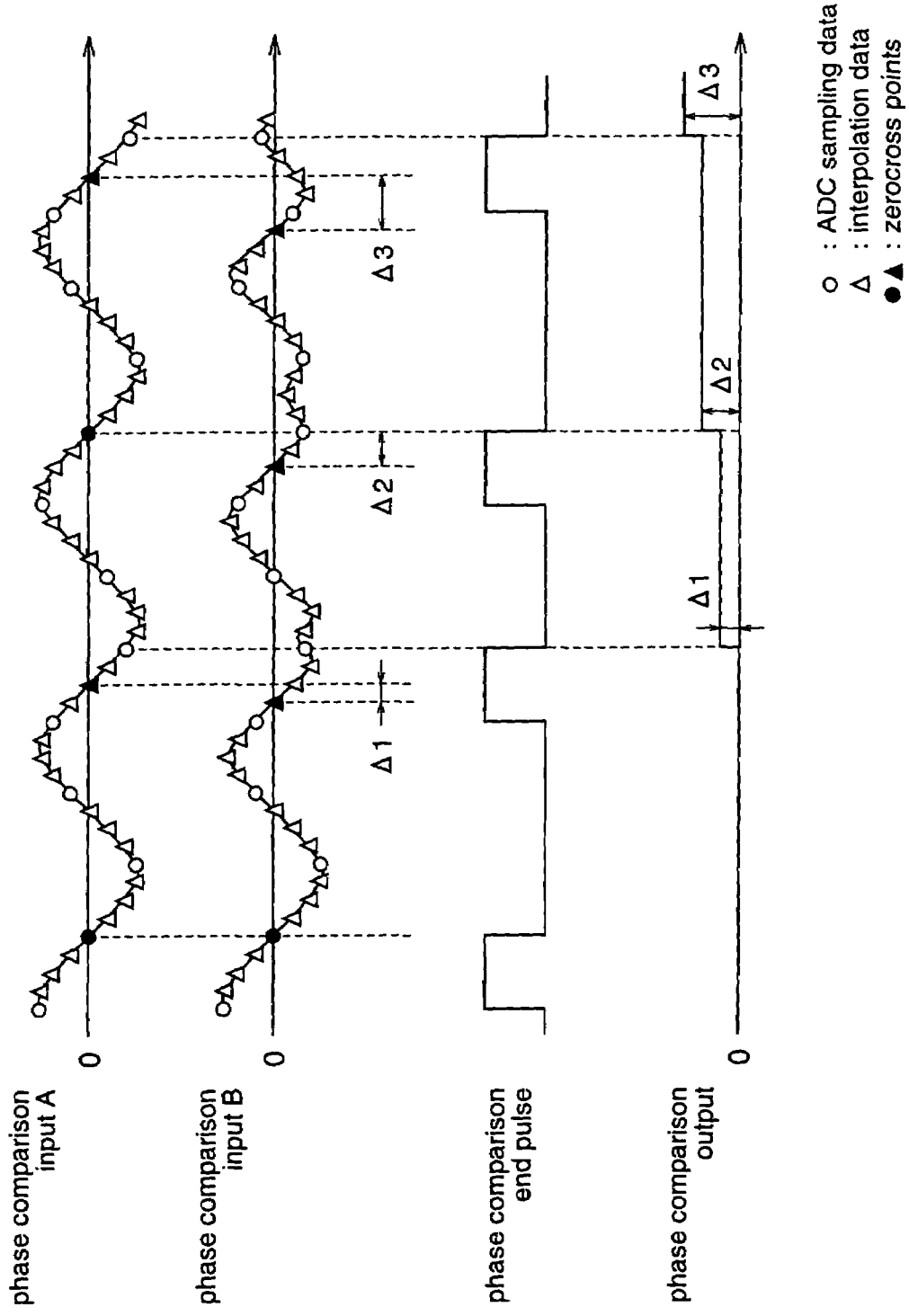
FIG. 21 is a diagram for explaining the operation of the conventional phase difference detection circuit.
Figure 22:
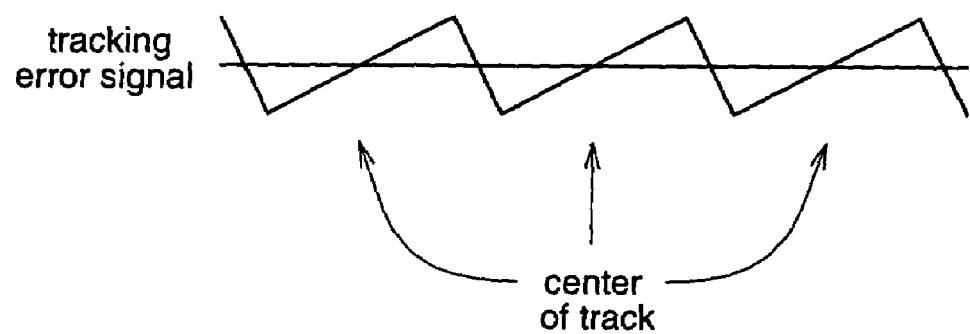
FIG. 22 is a diagram illustrating a tracking error signal detected by the conventional tracking error detection apparatus.
Figure 23A:
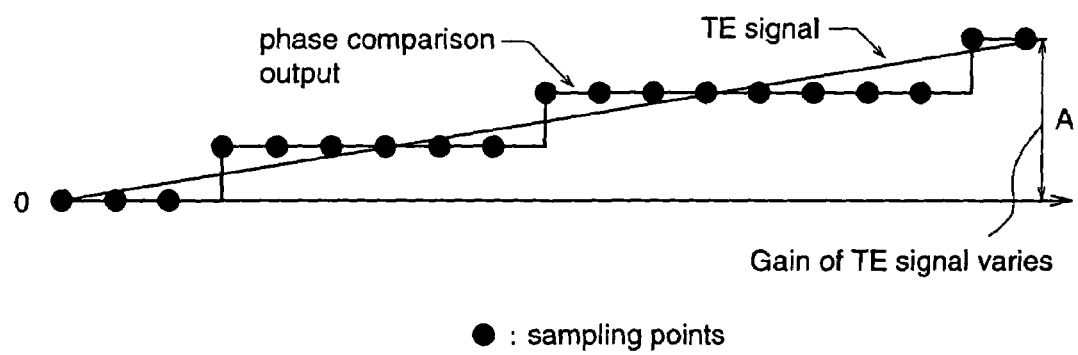
FIG. 23(a) is a diagram illustrating a tracking error signal at inner tracks of a disc, which is detected by the conventional tracking error detection apparatus during CAV playback.
Figure 23B:
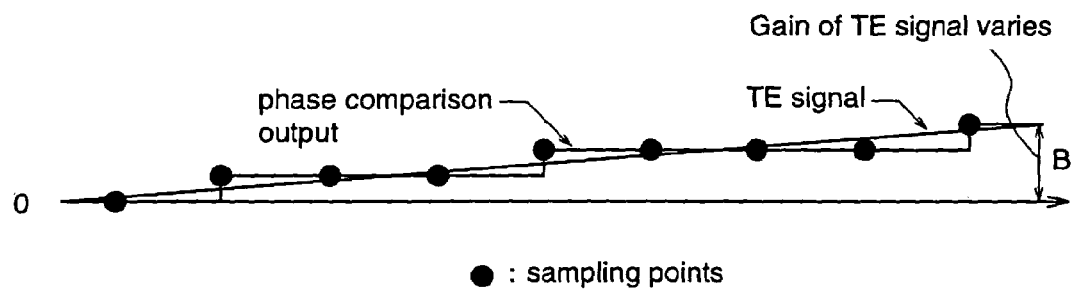
FIG. 23(b) is a diagram illustrating a tracking error signal at outer tracks of a disc, which is detected by the conventional tracking error detection apparatus during CAV playback.

That is, the phase difference detection circuit 22 receives the signals from the zerocross point detection circuits 106*a* and 106*b*, and the phase difference calculation unit 201 calculates a distance between the zerocross points detected by the zerocross point detection circuit 106*a* and 106*b*, and successively outputs the distance as a phase comparison result. Then, the pulse generation unit 202 generates a phase comparison end pulse as shown in FIG. 21. At this time, when the H-side pulse width detected by the pulse width detection circuit 21 is equal to or smaller than a predetermined value, the invalid pulse cancel unit 4 treats this pulse as an invalid pulse, and the phase difference calculation unit 201 does not perform phase comparison at this pulse.

The data updation unit 203 of the phase difference detection circuit 107 updates the output data using the phase comparison result outputted from the phase difference calculation unit 201, for every phase comparison end pulse outputted from the pulse generation unit 202, and maintains the output level of the output data until the next phase comparison end pulse arrives.

Figure 6A:
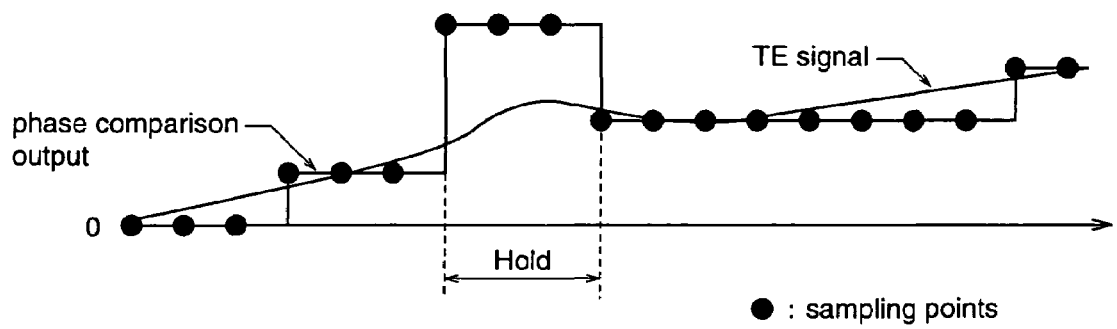
FIG. 6(a) is a diagram illustrating a tracking error signal in a case where an invalid pulse is not canceled in the tracking error detection apparatus according to the second embodiment.
Figure 6B:
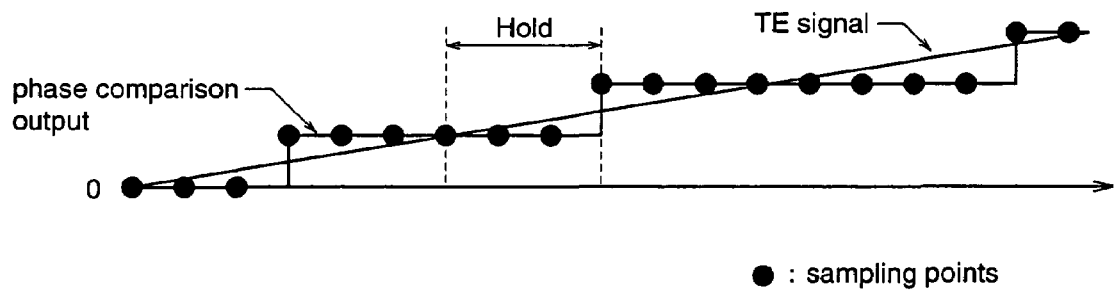
FIG. 6(b) is a diagram illustrating a tracking error signal in a case where an invalid pulse is canceled in the tracking error detection apparatus according to the second embodiment.

FIGS. 6(*a*) and 6(*b*) are diagrams for explaining the tracking error signal detected by the tracking error detection apparatus according to the second embodiment. To be specific, FIG. 6(*a*) shows the tracking error signal in the case where the invalid signal is not canceled, and FIG. 6(*b*) shows the tracking error signal in the case where the invalid signal is canceled.

As shown in FIG. 6(*a*), when the invalid pulse is not canceled by the invalid pulse cancel unit 4, false phase comparison is carried out in the position where the amplitude of the analog signal is not sufficiently obtained, resulting in false detection of phase difference at this position. Thereby, a tracking error signal that is finally generated by performing band-restriction with the LPF 108 is affected by the false detection in the phase difference detection circuit 22, and an accurate tracking error signal cannot be obtained.

On the other hand, when the invalid pulse is canceled by the invalid pulse cancel unit 4 as shown in FIG. 6(*b*), phase comparison is not carried out at the position where the amplitude of the analog signal is not sufficiently obtained, and the value of the just-previous phase comparison result is stored in the data updation unit 203, thereby avoiding influences of the false detection of phase difference.

Next, a concrete example will be described.

For example, assuming that the channel rate is 1T when using a 8-16 modulation code that is commonly used as a recording code for DVDs, the digital signals outputted from the first and second ADCs 104*a* and 104*b* are constituted by recording patterns of 3T to 14T. Since the linear recording density of DVDs is higher than that of CDs to increase the recording density, the amplitude of the playback waveform in the patterns of 3T and 4T in the recording code is smaller than that of a pattern having a long recording wavelength, due to interference between codes, and is easily affected by variations in the amplitude due to a defect or the like. Therefore, the pulse width of the sampling data is detected by the pulse width detection circuit 21, and the pulse whose pulse width detected by the pulse width detection circuit 21 is equal to or smaller than 4T (patterns of 3T and 4T) is canceled by the invalid pulse cancel unit 4 of the phase difference detection circuit 22 to prevent the phase difference calculation unit 201 from performing phase comparison at this pulse. In the above description, nT (n: integer equal to or larger than 1) means that the number of continuous "0" or "1" of data to be recorded is n.

As described above, in the tracking error detection apparatus according to the second embodiment, the pulse width detection circuit 21 detects the pulse width of the sampling data and, when the pulse width detected by the pulse width detection circuit 21 is equal to or shorter than a predetermined value, the invalid pulse cancel unit 4 of the phase difference detection circuit 22 treats the corresponding pulse as an invalid pulse, and the phase difference calculation unit 201 does not perform phase comparison at that pulse. Therefore, even when the amplitude of the analog signal inputted to the first and second ADCs 104*a* and 104*b* is not sufficiently obtained due to a defect or the like, an accurate tracking error signal can be obtained.

In the tracking error detection apparatus according to the second embodiment, when the invalid pulse is canceled by the invalid pulse cancel unit 4, the data updation unit 203 maintains the output level of the output data until the next phase comparison end pulse arrives. However, the output data from the data updation unit 203 may be updated using the average of plural phase difference comparison results that are obtained before and/or after the invalid pulse in the phase difference calculation unit 201 at the timing of the invalid pulse that is canceled by the invalid pulse cancel unit 4.

Furthermore, in the tracking error detection apparatus according to the second embodiment, the invalid pulse cancel unit 4 judges whether or not the H-side pulse width detected by the pulse width detection circuit 21 is equal to or smaller than a predetermined value. However, the invalid pulse cancel unit 4 may judge whether or not the L-side pulse width detected by the pulse width detection circuit 21 is equal to or smaller than a predetermined value, or it may judge whether or not the H-side and L-side pulse widths detected by the pulse width detection circuit 21 are equal to or smaller than predetermined values.

Embodiment 3

Figure 7:
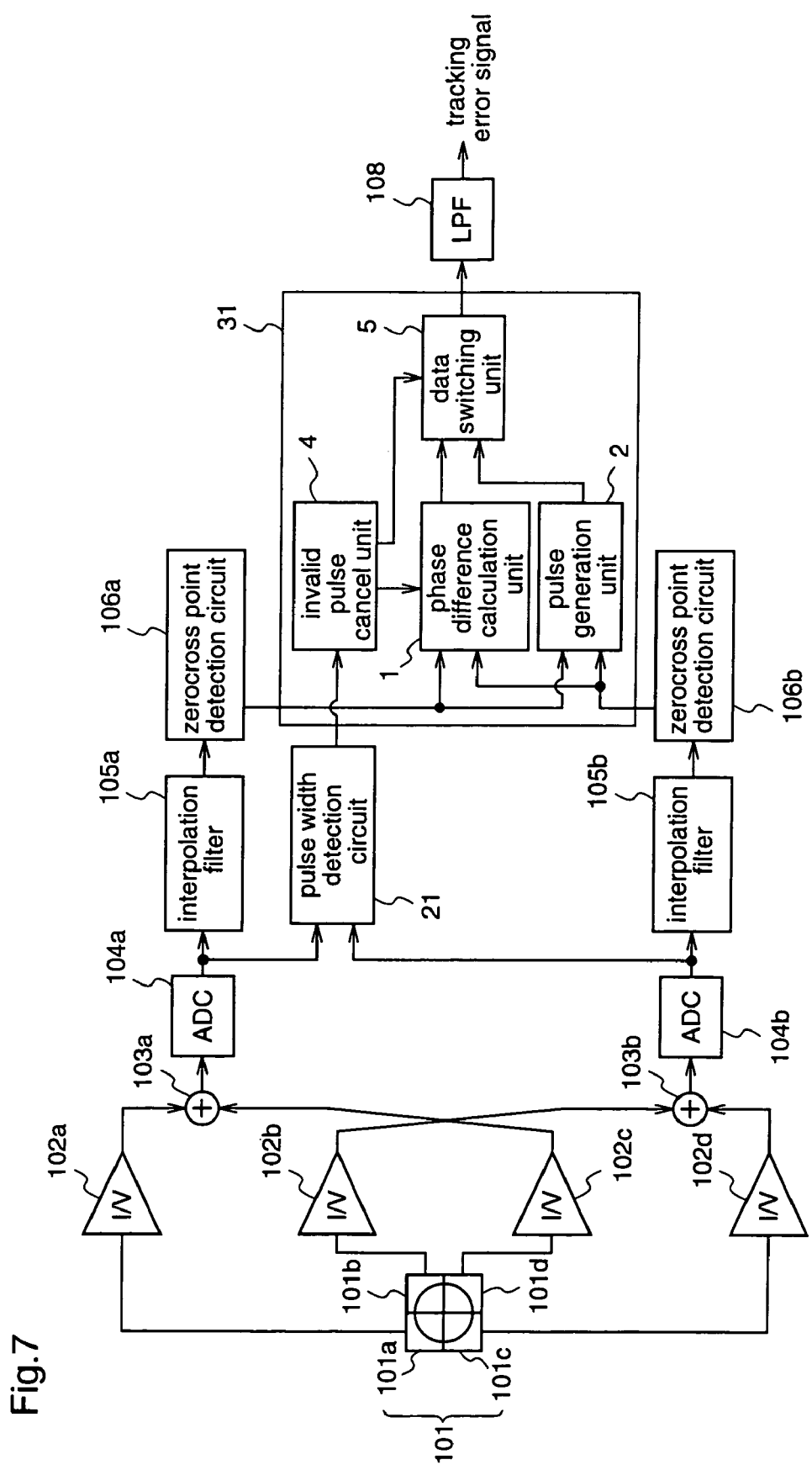
FIG. 7 is a block diagram illustrating a tracking error detection apparatus according to a third embodiment of the present invention.

Hereinafter, a tracking error detection apparatus according to a third embodiment of the present invention will be described. FIG. 7 is a block diagram illustrating an example of a tracking error detection apparatus according to the third embodiment.

With reference to FIG. 7, the tracking error detection apparatus comprises a photodetector 101, current-to-voltage converters 102a to 102d, first and second adders 103a and 103b, first and second analog-to-digital converters (ADC) 104a and 104b, first and second interpolation filters 105a and 105b, first and second zerocross point detection circuits 106a and 106b, a pulse width detection circuit 21, a phase difference detection circuit 31, and a low-pass filter (LPF) 108. Since the constituents of the tracking error detection apparatus according to the third embodiment other than the pulse width detection circuit 21 and the phase difference detection circuit 31 are identical to those of the conventional tracking error detection apparatus described with reference to FIG. 19, repeated description is not necessary.

The pulse width detection circuit 21 detects the pulse width of sampling data, and it is identical to the pulse width detection circuit 21 described for the second embodiment.

The phase difference detection circuit 31 comprises a phase difference calculation unit 1, a pulse generation unit 2, an invalid pulse cancel unit 4, and a data switching unit 5. Since the phase difference calculation unit 1, the pulse generation unit 2, and the invalid pulse cancel unit 4 constituting the phase difference detection circuit 31 are identical to the phase difference calculation unit 1, the pulse generation unit 2, and the invalid pulse cancel unit 4 according to the first and second embodiments described with reference to FIGS. 1 and 4, respectively, repeated description is not necessary.

The data switching unit 5 outputs the phase difference comparison result generated by the phase difference calculation unit 1, as a pulse signal corresponding to one sampling clock, at the timing of the phase comparison end pulse outputted from the pulse generation unit 2. Further, when the data switching unit 5 receives a signal from the invalid pulse cancel unit 4 indicating that the invalid pulse is canceled in the phase difference calculation unit 1, the data switching unit 5 outputs the just-previous phase difference comparison result obtained in the phase difference calculation unit 1, as a pulse signal corresponding to one sampling clock, at the timing of the canceled pulse.

Next, the operations of the pulse width detection circuit 21 and the phase difference detection circuit 31 will be described.

Figure 8A:
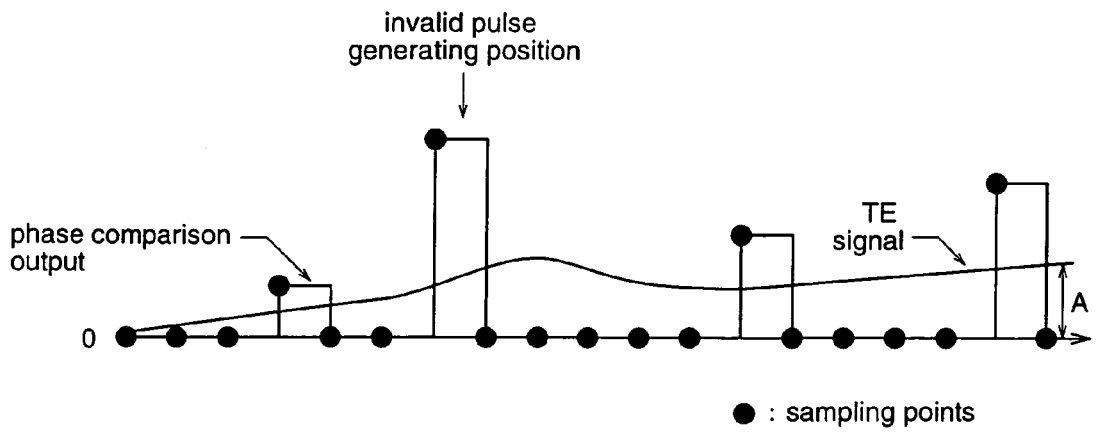
FIG. 8(a) is a diagram illustrating a tracking error signal in a case where an invalid pulse is not canceled in the tracking error detection apparatus according to the third embodiment.
Figure 8B:
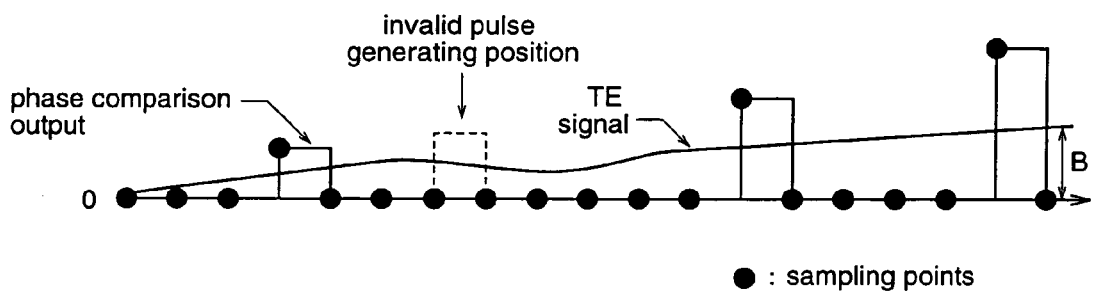
FIG. 8(b) is a diagram illustrating a tracking error signal in a case where an invalid pulse is canceled in the tracking error detection apparatus according to the third embodiment.
Figure 8C:
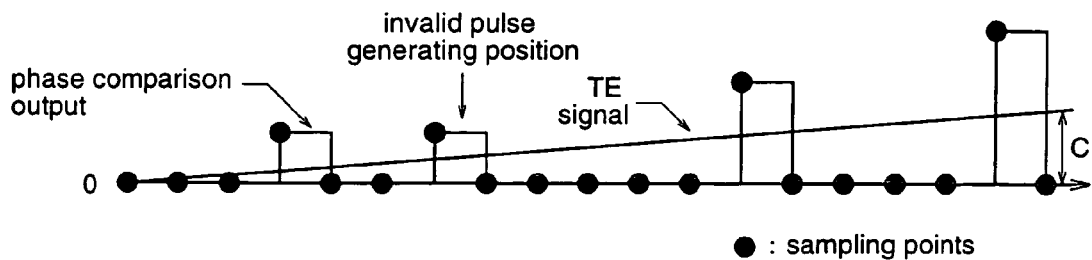
FIG. 8(c) is a diagram illustrating a tracking error signal in a case where an invalid pulse is canceled and a previous phase comparison result is output at a pulse corresponding to one clock at a timing of the canceled pulse, in the tracking error detection apparatus according to the second embodiment.

FIGS. 8(*a*)-8(*c*) are diagrams for explaining tracking error signals detected by the tracking error detection apparatus according to the third embodiment. To be specific, FIG. 8(*a*) shows a tracking error signal obtained when the invalid pulse is not canceled, FIG. 8(*b*) shows a tracking error signal obtained when the invalid pulse is canceled, and phase comparison is not carried out at the timing of the canceled pulse, and FIG. 8(*c*) shows a tracking error signal obtained when the invalid pulse is canceled, and the just-previous phase difference comparison result obtained in the phase difference calculation unit 1 is outputted as a pulse signal corresponding to one sampling clock, at the timing of the canceled pulse.

When the invalid pulse is not canceled by the invalid pulse cancel unit 4 as shown in FIG. 8(*a*), false phase comparison is carried out in a position where the amplitude of the analog signal is not sufficiently obtained, resulting in false detection of phase difference at this position. Therefore, the tracking error signal that is finally generated by performing band restriction using the LPF 108 is affected by the false detection by the phase difference detection circuit 22, and thereby an accurate tracking error signal cannot be obtained.

Further, as shown in FIG. 8(*b*), when the invalid pulse is canceled by the invalid pulse cancel unit 4 and phase comparison is not carried out at the timing of the canceled pulse, the information of the phase comparison output outputted from the phase difference detection circuit 31 is reduced. Therefore, the amplitude of the tracking error signal that is finally generated by performing band restriction using the LPF 108 is reduced at the position where the amplitude of the analog signal is not sufficiently obtained.

On the other hand, as shown in FIG. 8(*c*), when the data switching unit 5 cancels the invalid pulse and the just-previous phase difference comparison result obtained in the phase difference calculation unit 1 is output as a pulse signal corresponding to one sampling clock at the timing of the canceled pulse, undesired influence of false detection of phase difference on the tracking error signal can be avoided, and degradation in the amplitude of the tracking error signal at the position where the amplitude of the analog signal is not sufficiently obtained can also be avoided.

As described above, in the tracking error detection apparatus according to the third embodiment, the pulse width of the sampling data is detected by the pulse width detection circuit 21, and when the pulse width detected by the pulse width detection circuit 21 is equal to or smaller than a predetermined value, the invalid pulse cancel unit 4 of the phase difference detection circuit 31 treats the corresponding pulse as an invalid pulse, and the phase difference calculation unit 1 does not perform phase comparison at this pulse. Further, the data switching unit 5 outputs the just-previous phase difference comparison result obtained in the phase difference calculation unit 1, as a pulse signal corresponding to one sampling clock, at the timing of the canceled pulse, whereby an accurate tracking error signal can be obtained even when the amplitude of the analog signal inputted to the first and second ADCs 104a and 104b is not satisfactorily obtained due to a defect or the like.

In the tracking error detection apparatus according to the third embodiment, when the invalid pulse is canceled by the invalid pulse cancel unit 4, the data switching unit 5 outputs the just-previous phase difference comparison result as a pulse signal corresponding to one sampling clock at the timing of the canceled invalid pulse. However, the data switching unit 5 may output the average of plural phase difference comparison results obtained before and/or after the invalid pulse, as a pulse signal corresponding to one sampling clock at the timing of the invalid pulse.

Further, in the tracking error detection apparatus according to the third embodiment, as in the tracking error detection apparatus according to the second embodiment, the invalid pulse cancel unit 4 judges whether or not the H-side pulse width detected by the pulse width detection circuit 21 is equal to or smaller than a predetermined value. However, the invalid pulse cancel unit 4 may judge whether or not the L-side pulse width detected by the pulse width detection circuit 21 is equal to or smaller than a predetermined value, or it may judge whether or not the H-side and L-side pulse widths detected by the pulse width detection circuit 21 are equal to or smaller than predetermined values, respectively.

Embodiment 4

Figure 9:
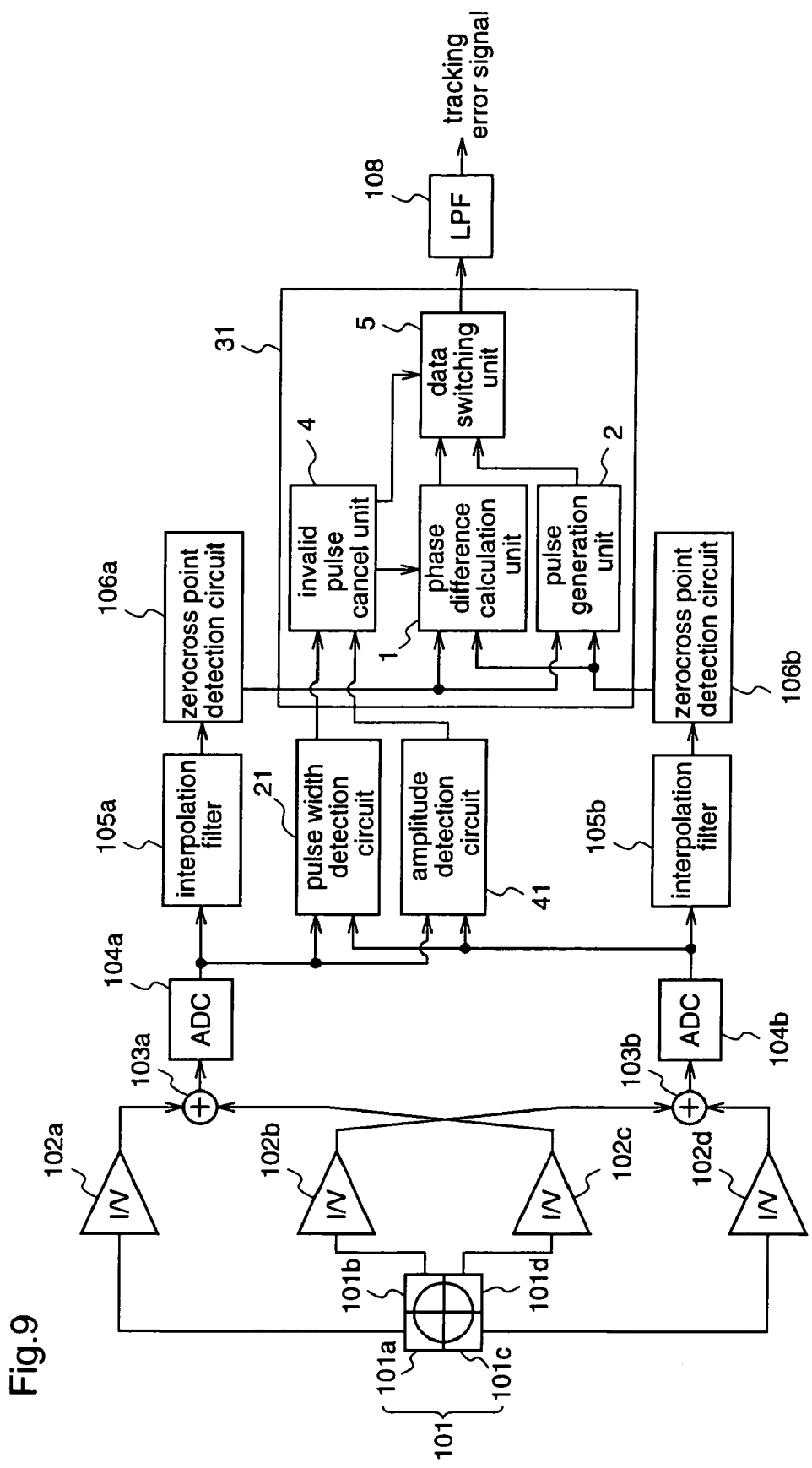
FIG. 9 is a block diagram illustrating a tracking error detection apparatus according to a fourth embodiment of the present invention.

Hereinafter, a tracking error detection apparatus according to a fourth embodiment of the present invention will be described. FIG. 9 is a block diagram illustrating an example of a tracking error detection apparatus according to the fourth embodiment.

In FIG. 9, the tracking error detection apparatus comprises a photodetector 101, current-to-voltage converters 102a to 102d, first and second adders 103a and 103b, first and second analog-to-digital converters (ADC) 104a and 104b, first and second interpolation filters 105a and 105b, first and second zerocross point detection circuits 106a and 106b, a pulse width detection circuit 21, a phase difference detection circuit 31, an amplitude detection circuit 41, and a low-pass filter (LPF) 108. Since the constituents of the tracking error detection apparatus according to the fourth embodiment other than the amplitude detection circuit 41 are identical to those of the tracking error detection apparatus according to the third embodiment described with reference to FIG. 7, repeated description is not necessary.

The amplitude detection circuit 41 detects an envelope signal from each of the respective digital signals outputted from the first and second ADCs 104a and 104b, and generates a gate signal indicating as to whether the invalid pulse cancel unit 4 of the phase difference detection circuit 31 is operated or not, according to whether or not the value of the envelope signal is equal to or lower than a predetermined threshold value. When the value of the envelope signal is equal to or smaller than the threshold value, the amplitude detection circuit 41 outputs a signal indicating that the invalid pulse cancel unit 4 should be operated. When the value of the envelope signal is larger than the threshold value, the amplitude detection circuit 41 outputs a signal indicating that the invalid pulse cancel unit 4 should not be operated. The predetermined threshold value possessed by the amplitude detection circuit 41 may be arbitrarily set.

Next, the operation of the amplitude detection circuit 41 according to the fourth embodiment will be described.

Figure 10A:
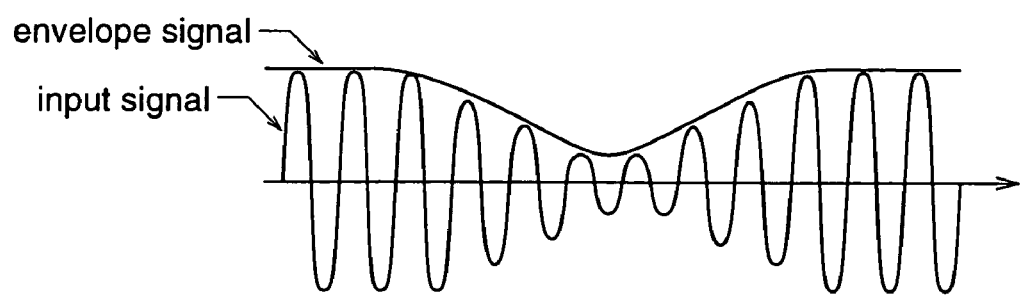
FIG. 10(a) is a diagram illustrating an envelope signal detected by an amplitude detection circuit according to the fourth embodiment.
Figure 10B:
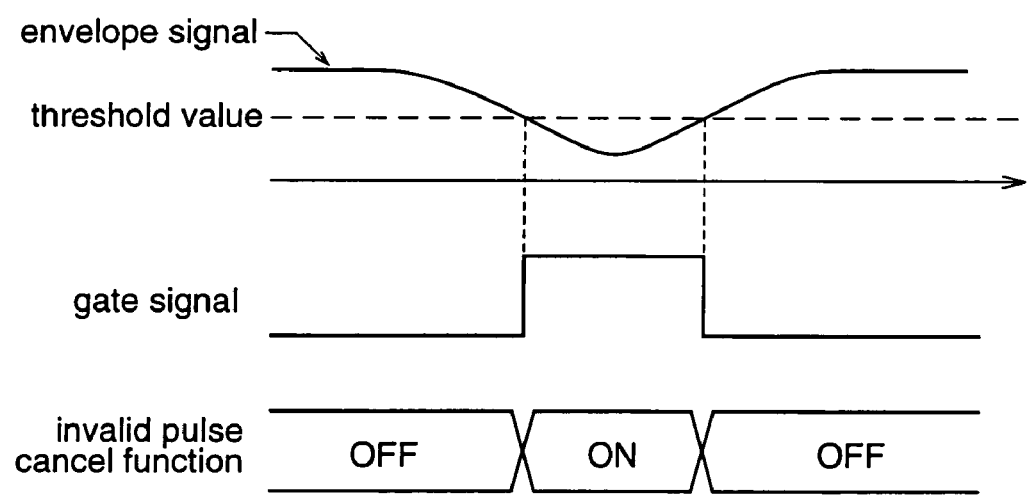
FIG. 10(b) is a diagram illustrating a gate signal outputted from the amplitude detection circuit according to the fourth embodiment.

FIGS. 10(*a*) and 10(*b*) are diagrams for explaining the operation of the amplitude detection circuit 41. To be specific, FIG. 10(*a*) shows an envelope signal detected by the amplitude detection circuit 41, and FIG. 10(*b*) shows a gate signal outputted from the amplitude detection circuit 41.

Each of the digital signals outputted from the first and second ADCs 104a and 104b is input to the amplitude detection circuit 41, and an envelope signal as shown in FIG. 10(*a*) is detected. Then, as shown in FIG. 10(*b*), the envelope signal is compared with a predetermined threshold value. When the envelope signal is equal to or lower than the threshold value, the amplitude detection circuit 41 judges that the input signal has a small signal amplitude, and outputs an H gate signal indicating that the invalid pulse cancel unit 4 of the phase difference detection circuit 31 should be operated. On the other hand, when the value of the envelope signal is larger than the threshold value, the amplitude detection circuit 41 judges that the input signal has a large signal amplitude, and outputs an L gate signal indicating that the invalid pulse cancel unit 4 should not be operated.

Thereafter, the gate signal outputted from the amplitude detection circuit 41 is input to the invalid pulse cancel unit 4 of the phase difference detection circuit 31. The invalid pulse cancel unit 4 operates only when the gate signal is H, and cancels, as an invalid pulse, a pulse of a short pulse width that is detected by the pulse width detection circuit 21.

On the other hand, while the gate signal is L, the invalid pulse cancel unit 4 does not operate. In this case, with respect to a signal in a favorable amplitude state where it is not necessary to cancel the invalid pulse, the corresponding pulse is not canceled even when the pulse has a short pulse width that is detected by the pulse width detection circuit 21.

As described above, the tracking error detection apparatus according to the fourth embodiment is provided with the amplitude detection circuit 41 that detects an envelope signal from each of the two sequences of digital signals outputted from the first and second ADCs 104a and 104b, and operates the invalid pulse cancel unit 4 only when the value of the envelope signal is equal to or smaller than a predetermined threshold value. Therefore, when the two sequences of digital signals are in the favorable amplitude states where it is not necessary to cancel the invalid pulse, phase comparison of the two sequences of digital signals can be carried out without operating the invalid pulse cancel unit 4, whereby more information of phase comparison results can be obtained from the phase difference detection circuit 31, resulting in an increase in precision of the tracking error signal generated by the tracking error detection apparatus.

Embodiment 5

Hereinafter, a tracking error detection apparatus according to a fifth embodiment of the present invention will be described.

Figure 11:
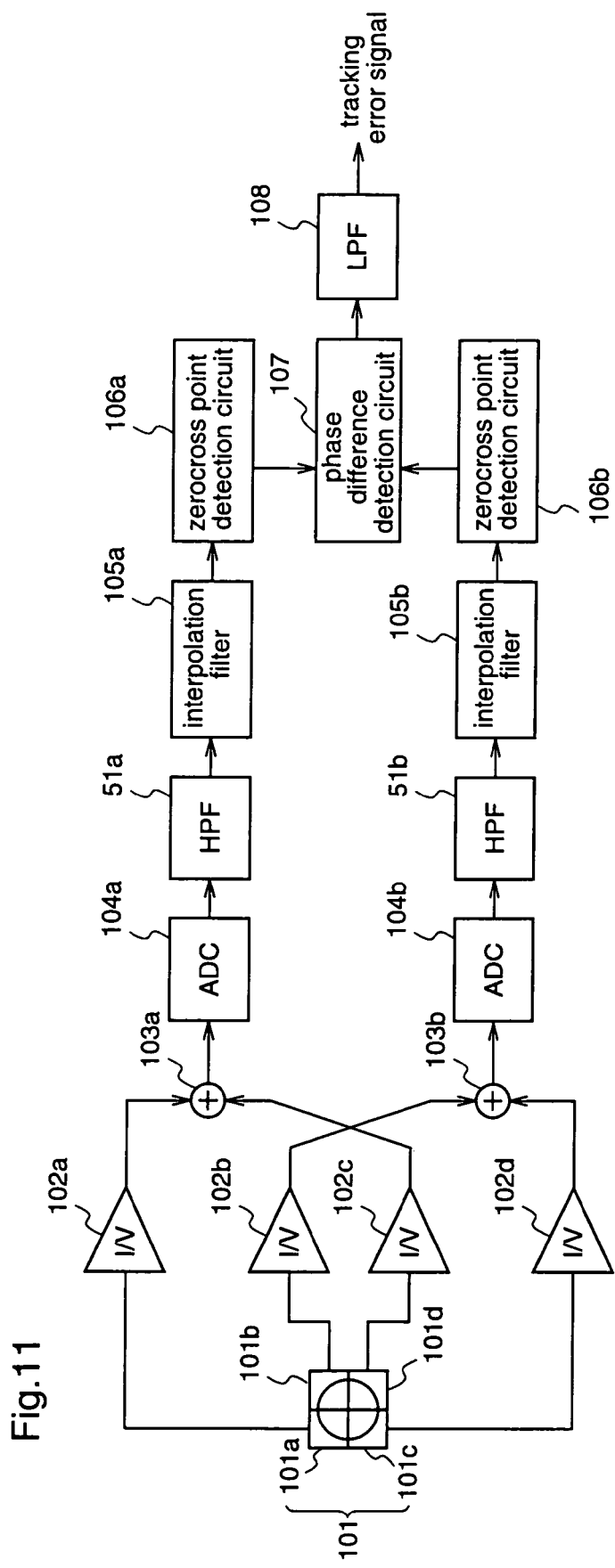
FIG. 11 is a block diagram illustrating a tracking error detection apparatus according to a fifth embodiment of the present invention.

FIG. 11 is a block diagram illustrating an example of a tracking error detection apparatus according to the fifth embodiment.

In FIG. 11, the tracking error detection apparatus comprises a photodetector 101, current-to-voltage converters 102a to 102d, first and second adders 103a and 103b, first and second analog-to-digital converters (ADC) 104a and 104b, first and second high-pass filters (HPF) 51a and 51b, first and second interpolation filters 105a and 105b, first and second zerocross point detection circuits 106a and 106b, a phase difference detection circuit 107, and a low-pass filter (LPF) 108. Since the constituents of the tracking error detection apparatus according to the fifth embodiment other than the HPFs 51a and 51b are identical to those of the conventional tracking error detection apparatus described with reference to FIG. 19, repeated description is not necessary.

The HPFs 51a and 51b receive the two sequences of digital signals outputted from the ADCs 104a and 104b, and remove frequencies equal to and lower than a predetermined cutoff frequency, thereby removing variations in the voltage level due to a defect or the like that is possessed by the signals inputted to the ADCs 104a and 104b. The predetermined cutoff frequency employed by the HPF 51a and 51b may be arbitrarily set, and it is set at 100K~300 KHz in this fifth embodiment.

Next, the operations of the HPFs 51a and 51b will be described.

Figure 12A:
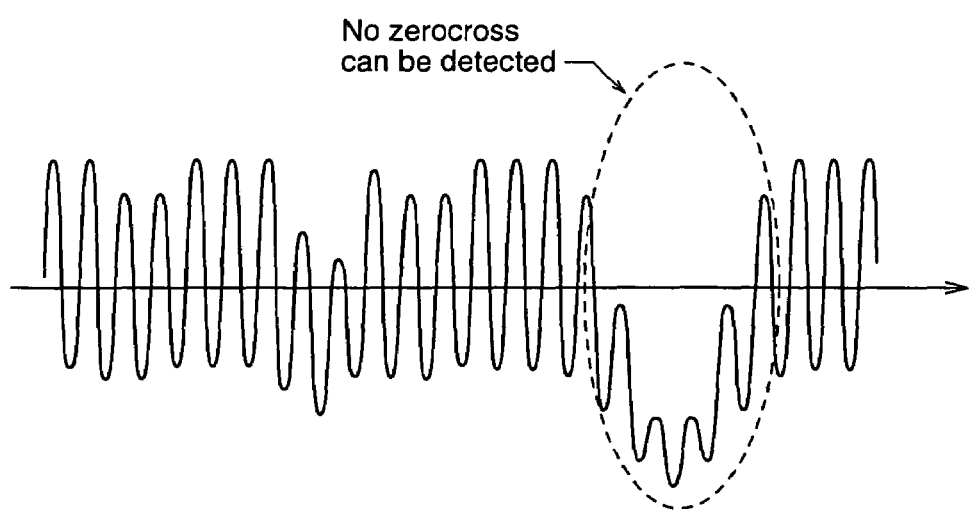
FIG. 12(a) is a diagram illustrating an input signal to a zerocross point detection circuit when no HPF is used.
Figure 12B:
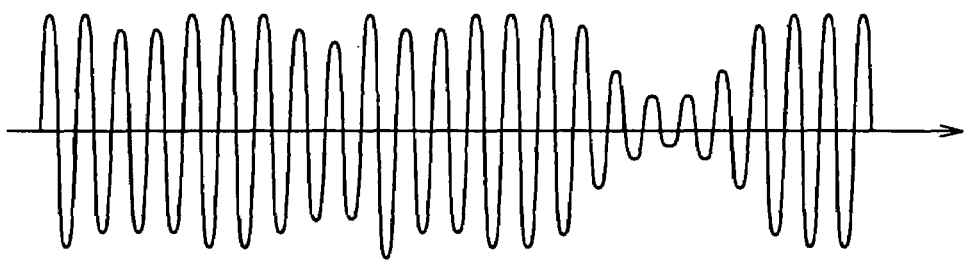
FIG. 12(b) is a diagram illustrating an input signal to the zerocross point detection circuit when HPF is used.

FIGS. 12(a) and 12(b) are diagrams for explaining the operations of the HPFs 51a and 51b according to the fifth embodiment. To be specific, FIG. 12(a) shows an input signal to the zerocross point detection circuit in the case where the HPFs are not used, and FIG. 12(b) shows an input signal to the zerocross point detection circuit in the case where the HPFs are used.

As shown in FIG. 12(a), when the voltage level of the analog signal inputted to the ADCs 104a and 104b varies due to a defect or the like, the zerocross point detection circuits 106a and 106b cannot detect zerocross points in the corresponding position. Therefore, the phase difference detection circuit 107 does not perform phase comparison in the position where the voltage level of the analog signal varies due to a defect or the like. As a result, an accurate tracking error signal cannot be obtained.

So, the tracking error detection apparatus according to the fifth embodiment is provided with the HPFs 51a and 51b for removing variations in the voltage level due to a defect or the like that is possessed by the analog signal inputted to the ADCs 104a and 104b.

Thereby, an input signal to the zerocross point detection circuits 106a and 106b as shown in FIG. 12(b) can be obtained, and the zerocross point detection circuits 106a and 106b can detect zerocross points correctly. As a result, an accurate tracking error signal can be detected by the tracking error detection apparatus.

As described above, in the tracking error detection apparatus according to the fifth embodiment, variations in the voltage level due to a defect or the like possessed by the analog signals inputted to the ADCs 104a and 104b are removed by the HPF 51a and 51b, respectively, whereby the zerocross point detection circuits 106a and 106b can correctly detect zerocross points. Therefore, it is possible to correctly detect a tracking signal even when the voltage level varies due to a defect or the like.

Figure 19:
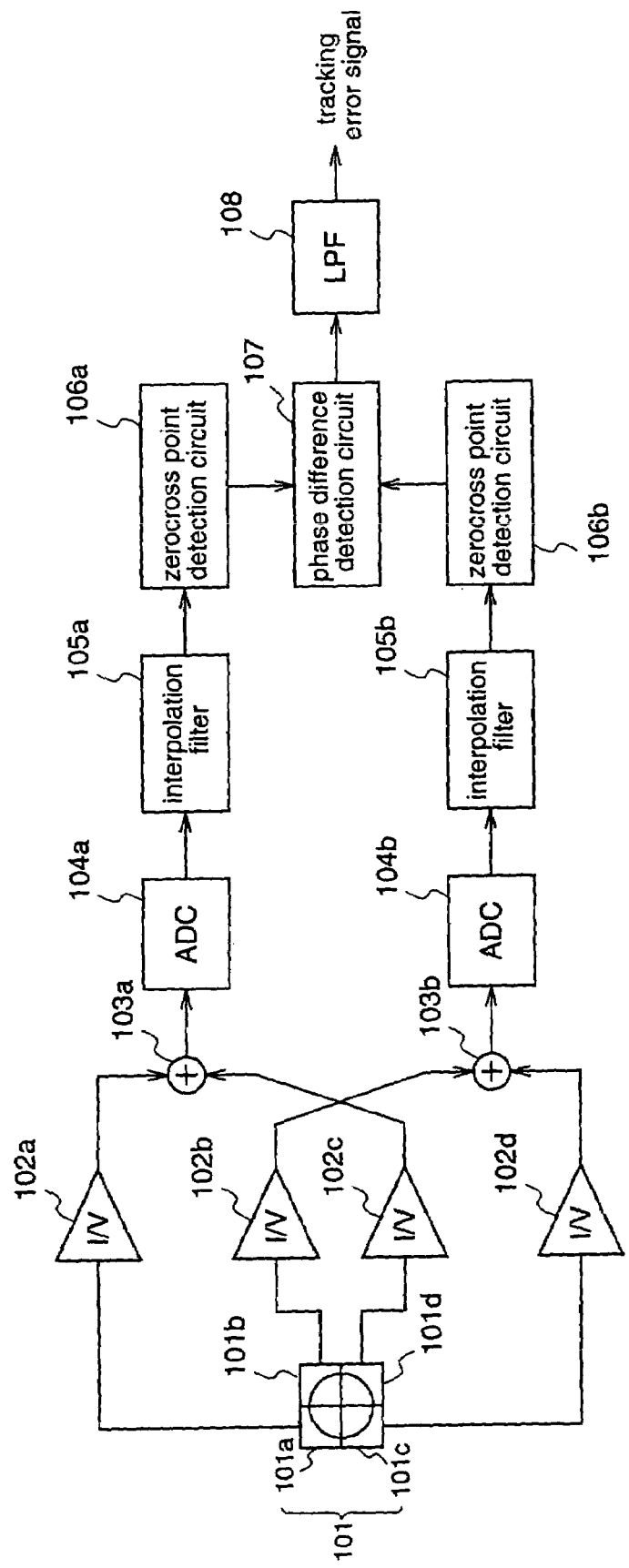
FIG. 19 is a block diagram illustrating a conventional tracking error detection apparatus.

While the tracking error detection apparatus according to the fifth embodiment is obtained by adding the HPFs 51a and 51b to the conventional tracking error detection apparatus shown in FIG. 19, the HPFs 51a and 51b may be added to any of the tracking error detection apparatuses described for the first to fourth embodiments.

Further, in the tracking error detection apparatus according to the first to fifth embodiments, two sequences of analog signals are generated by the first and second adders which are signal generators for generating two signal sequences, and thereafter, two sequences of digital signals are generated by the first and second ADCs 104a and 104b. However, the method of generating two sequences of digital signals to be input to the phase difference detection circuit 107 is not restricted thereto. For example, the analog signals outputted from the respective photoreceptor elements of the photodetector 101 may be converted into digital signals by the ADC 104 and then two sequences of signals may be generated.

Embodiment 6

Hereinafter, a tracking error detection apparatus according to a sixth embodiment of the present invention will be described.

Figure 13:
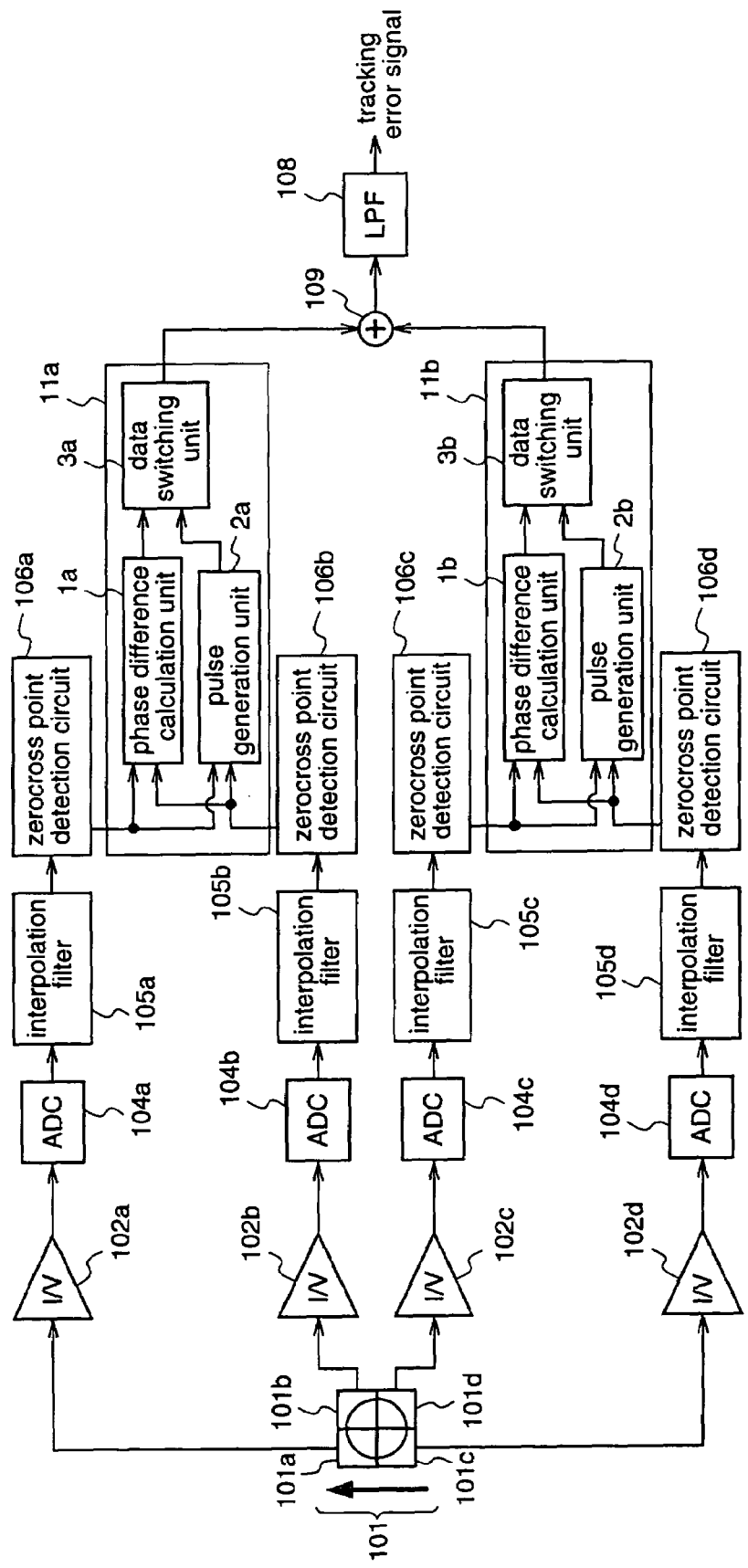
FIG. 13 is a block diagram illustrating a tracking error detection apparatus according to a sixth embodiment of the present invention.

FIG. 13 is a block diagram illustrating an example of a tracking error detection apparatus according to the sixth embodiment.

In FIG. 13, the tracking error detection apparatus comprises a photodetector 101 that has photoreceptor elements 101a, 101b, 101c, and 101d each receiving a reflected light beam from a light spot, and outputs photo currents according to the amounts of light received by the respective photoreceptor elements; first to fourth current-to-voltage converters 102a to 102d for converting the photo currents outputted from the photodetector 101 into voltage signals; first to fourth analog-to-digital converters (ADCs) 104a to 104d for obtaining first to fourth digital signal sequences from the voltage signals obtained by the first to fourth current-to-voltage converters 102a to 102d; first to fourth interpolation filters 105a to 105d for subjecting the inputted digital signals to interpolation; first to fourth zerocross point detection circuits 106a to 106d for detecting zerocross points of the first to fourth digital signal sequences interpolated by the first to fourth interpolation filters 105a to 105d; first and second phase difference detection circuits 11a and 11b for performing phase comparison using a distance between the zerocross points of predetermined two sequences of digital signals among the zerocross points of the four sequences of digital signals, and outputting the phase comparison result between the zerocross points; an adder 109 for adding the output signal from the first phase difference detection circuit 11a and the output signal from the second phase difference detection circuit 11b; and a low-pass filter (LPF) 108 for subjecting the output signal from the adder 109 to band restriction to obtain a tracking error signal. In this sixth embodiment, the photodetector 101 is provided with the four photoreceptor elements 101a, 101b, 101c, and 101d that are partitioned in the tangential direction and the perpendicular direction with respect to an information track as an information pit line on the recording medium, and the direction in which the information track mapped thereon is extended is shown by an arrow in FIG. 13. Further, a zerocross point is a point where an inputted digital signal intersects a center level of the digital signal that is calculated from an average value or the like of the digital signal.

Next, the first and second phase difference detection circuits 11a and 11b will be described in more detail.

The first phase difference detection circuit 11a performs phase comparison using the distance between the zerocross points of the two sequences of digital signals which are obtained from the photoreceptors positioned forward in the advancing direction of the information track, i.e., the zerocross points outputted from the zerocross point detection circuits 106a and 106b, among the zerocross points of the four sequences of digital signals, and outputs the phase comparison results at the respective zerocross points as pulse signals each corresponding to one sampling clock, respectively. The first phase difference detection circuit 11a comprises a phase difference calculation unit 1a, a pulse generation unit 2a, and a data switching unit 3a.

The second phase difference detection circuit 11b performs phase comparison using the distance between the zerocross points of the two sequences of digital signals which are obtained from the photoreceptors positioned backward in the advancing direction of the information track, i.e., the zerocross points outputted from the zerocross point detection circuits 106c and 106d, among the zerocross points of the four sequences of digital signals, and outputs the phase comparison results at the respective zerocross points as pulse signals each corresponding to one sampling clock, respectively. The second phase difference detection circuit 11b comprises a phase difference calculation unit 1b, a pulse generation unit 2b, and a data switching unit 3b.

Since the phase difference calculation units 1a and 1b, the pulse generation units 2a and 2b, and the data switching units 3a and 3b correspond to the phase difference calculation unit 1, the pulse generation unit 2, and the data switching unit 3 described with reference to FIG. 1, repeated description is not necessary.

Next, detection of a tracking error signal using the phase difference method will be described with reference to FIG. 14.

It is known that detection of a tracking error signal using the phase difference method causes an offset depending on the pit depth.

Figure 14A:
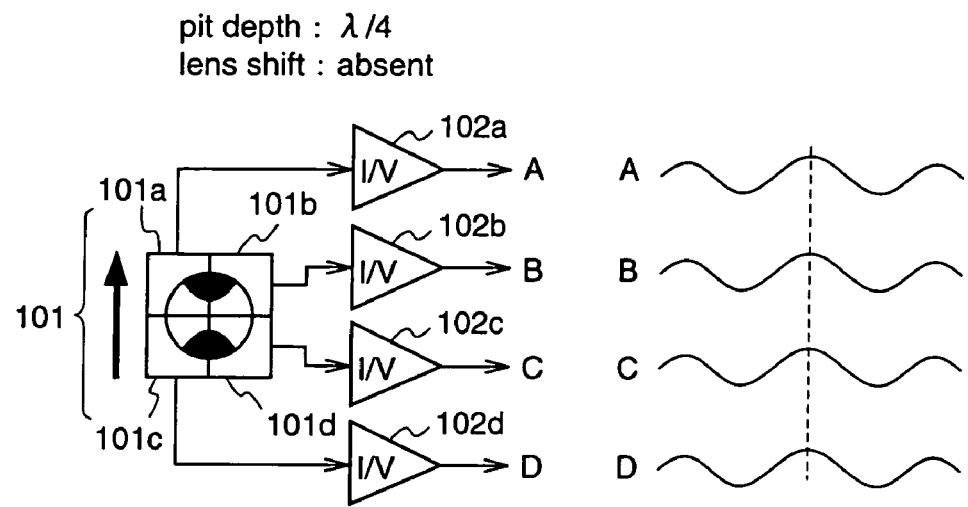
FIG. 14(a) is a diagram illustrating outputs of current-to-voltage converters 102a to 102d when the pit depth is $\lambda/4$ and there is no lens shift.
Figure 14B:
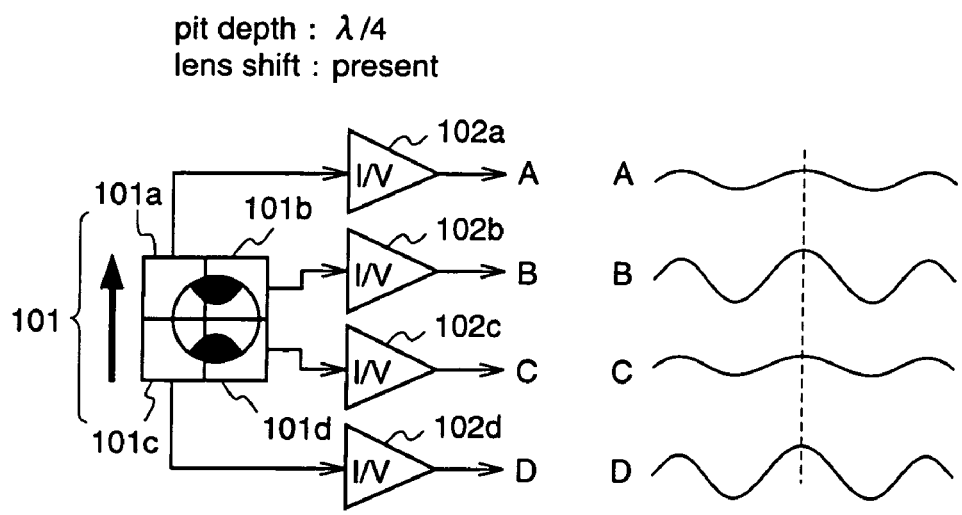
FIG. 14(b) is a diagram illustrating outputs of the current-to-voltage converters 102a to 102d when the pit depth is $\lambda/4$ and there is lens shift.
Figure 14C:
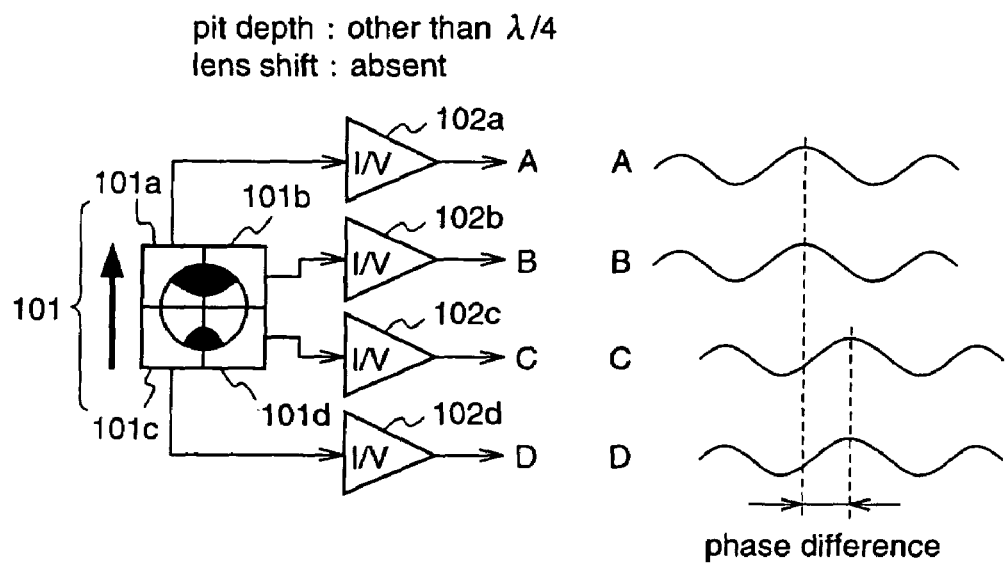
FIG. 14(c) is a diagram illustrating outputs of current-to-voltage converters 102a to 102d when the pit depth is other than $\lambda/4$ and there is no lens shift.
Figure 14D:
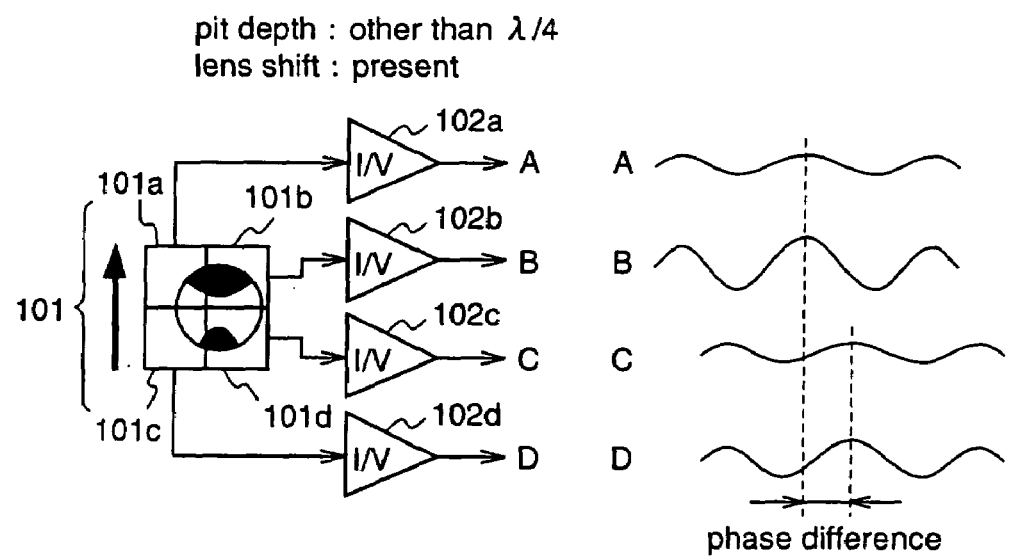
FIG. 14(d) is a diagram illustrating outputs of current-to-voltage converters 102a to 102d when the pit depth is other than $\lambda/4$ and there is lens shift.

FIGS. 14(a)-14(d) are diagrams for explaining the principle of an offset that occurs in the tracking error signal depending on the pit depth. To be specific, FIG. 14(a) shows the outputs of the first to fourth current-to-voltage converters 102a to 102d in the case where the pit depth is λ/4 and there is no lens shift, FIG. 14(b) shows the outputs of the first to fourth current-to-voltage converters 102a to 102d in the case where the pit depth is λ/4 and there is lens shift, FIG. 14(c) shows the outputs of the first to fourth current-to-voltage converters 102a to 102d in the case where the pit depth is other than λ/4 and there is no lens shift, and FIG. 14(d) shows the outputs of the first to fourth current-to-voltage converters 102a to 102d in the case where the pit depth is other than λ/4 and there is lens shift.

The photodetector 101 comprises the first to fourth photoreceptors 101a, 101b, 101c, and 101d, and the direction in which the information track mapped on the photodetector 101 is extended is shown by an arrow.

As shown in FIGS. 14(a) and 14(b), when the pit depth is λ/4 (λ is the wavelength of the light beam), no phase difference occurs in the outputs of the first to fourth current-to-voltage converters 102a to 102d, and the waveform patterns that appear in a (A+C) signal and a (B+D) signal each obtained by adding the outputs of the diagonally placed photoreceptor elements constituting the photodetector 101 are identical to each other. Therefore, even when lens shift occurs as shown in FIG. 14(b) and thereby the light spot on the photodetector moves, the phase difference that occurs between the (A+C) signal and the (B+D) signal becomes zero when the light spot is on the center of the track.

On the other hand, when the pit depth is not λ/4, a phase difference that varies according to the focusing state occurs as shown in FIGS. 14(c) and 14(d). When the light spot on the photodetector is not shifted as shown in FIG. 14(c), the signal amplitudes of the A~D signals are not changed and, therefore, the waveform patterns that appear in the (A+C) signal and the (B+D) signal are not affected by the phase difference that varies according to the focusing state, and the tracking error signal becomes zero. However, when the light spot on the photodetector is shifted due to lens shift, the signal amplitudes of the A~D signals are change and, therefore, the waveform patterns that appear in the (A+C) signal and the (B+D) signal are affected by the phase difference that varies according to the focusing state, resulting in an offset in the tracking error signal.

Therefore, in the tracking error detection apparatuses described with respect to the first to fifth embodiments, when the depth of pits carved in the disc is different from λ/4, it is necessary to additionally provide a control circuit for canceling the above-mentioned offset to correctly detect a tracking error signal.

So, the tracking error detection apparatus according to the sixth embodiment detects a tracking error signal using a phase difference between two photoreceptors positioned forward or backward with respect to the information track advancing direction, taking notice that no phase difference occurs between the two photoreceptor elements positioned forward or backward in the information track advancing direction, i.e., the photoreceptor elements 101a and 101b or the photoreceptor elements 101c and 101d.

To be specific, as shown in FIG. 13, a phase difference between the photoreceptors 101a and 101b is detected by the first phase difference detection circuit 11a while a phase difference between the photoreceptors 101c and 101d is detected by the second phase difference detection circuit 11b, and the output signal of the first phase difference detection circuit 11a and the output signal of the second phase difference detection circuit 11b are added by the adder 109, and thereafter, the signal outputted from the adder 109 is subjected to band restriction by the LPF 108 to obtain a tracking error signal.

When the tracking error signal is detected, the phase difference between the photoreceptors placed forward and backward with respect to the information track advancing direction, i.e., the phase difference of the output signals between the photoreceptors 101a and 101b and the photoreceptors 101c and 101d, does not affect an-the tracking error signal, whereby variations in the offset during tracking error detection can be suppressed even when the objective lens is displaced due to tracking control and thereby the light spot is displaced on the photodetector 101.

As described above, in the tracking error detection apparatus according to the sixth embodiment, even when performing CAV playback in which the channel rate at the inner track differs from that at the outer track, the amplitude of the tracking error signal does not vary between the inner track and the outer track, thereby resolving dependence of the tracking error signal on the linear velocity during CAV playback. Further, no offset that depends on the depth of the pit carved in the disc occurs, thereby producing an accurate tracking error signal.

Embodiment 7

Next, a tracking error detection apparatus according to a seventh embodiment of the present invention will be described.

Figure 15:
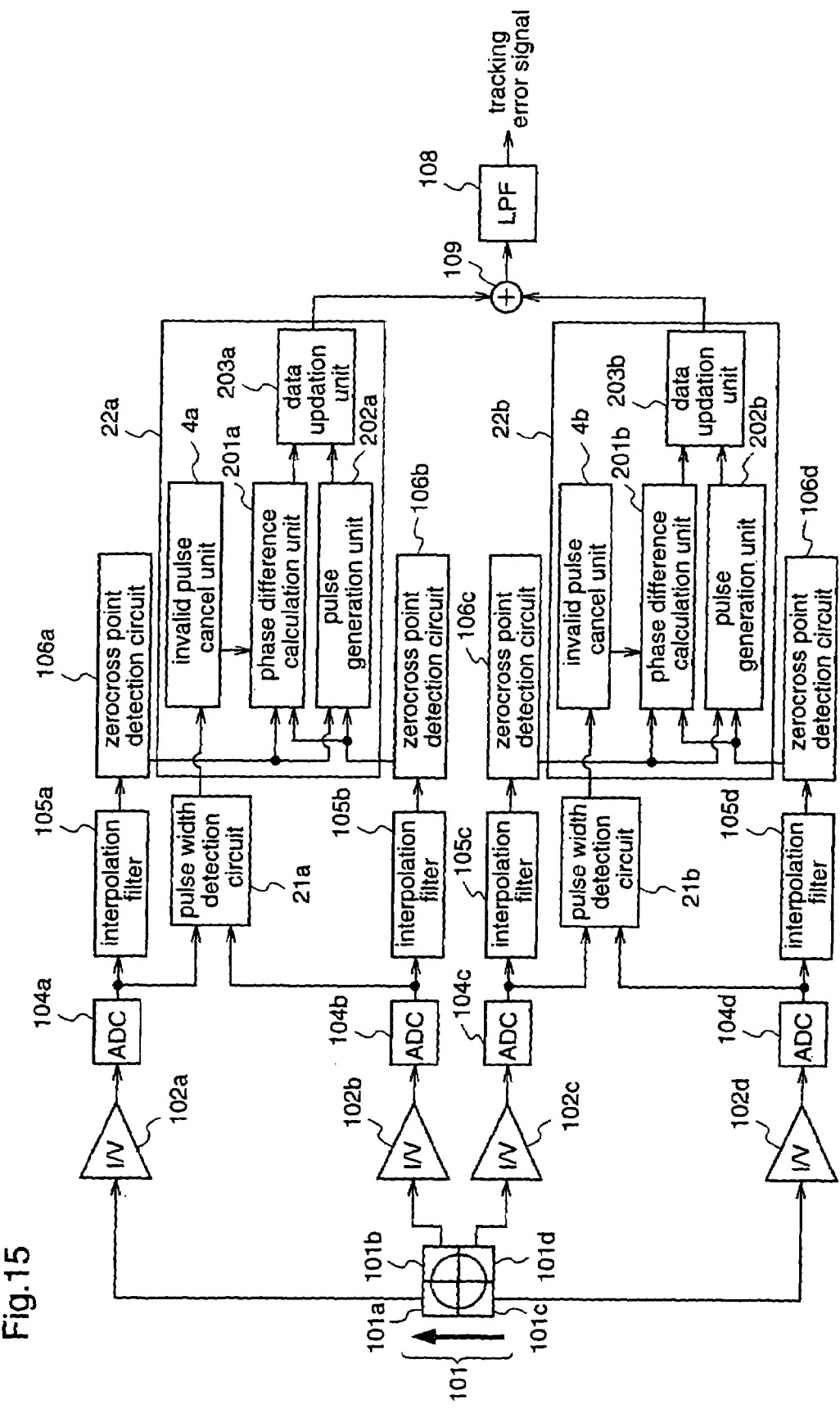
FIG. 15 is a block diagram illustrating a tracking error detection apparatus according to a seventh embodiment of the present invention.

FIG. 15 is a block diagram illustrating an example of a tracking error detection apparatus according to the seventh embodiment.

In the tracking error detection apparatus according to the seventh embodiment, the pulse width detection circuit 21 and the phase difference detection circuit 22 according to the second embodiment shown in FIG. 4 are provided for the two sequences of digital signals obtained from the photoreceptors that are positioned forward in the information track advancing direction, and for the two sequences of digital signals obtained from the photoreceptors positioned backward in the direction.

Thereby, even when the amplitude of the analog signal inputted to the first to fourth ADCs 104a to 104d is not sufficiently obtained due to a defect or the like, an accurate tracking error signal can be obtained. Further, no offset that depends on the depth of pit carved in the disc occurs, thereby producing an accurate tracking error signal.

Embodiment 8

Next, a tracking error detection apparatus according to an eighth embodiment of the present invention will be described.

Figure 16:
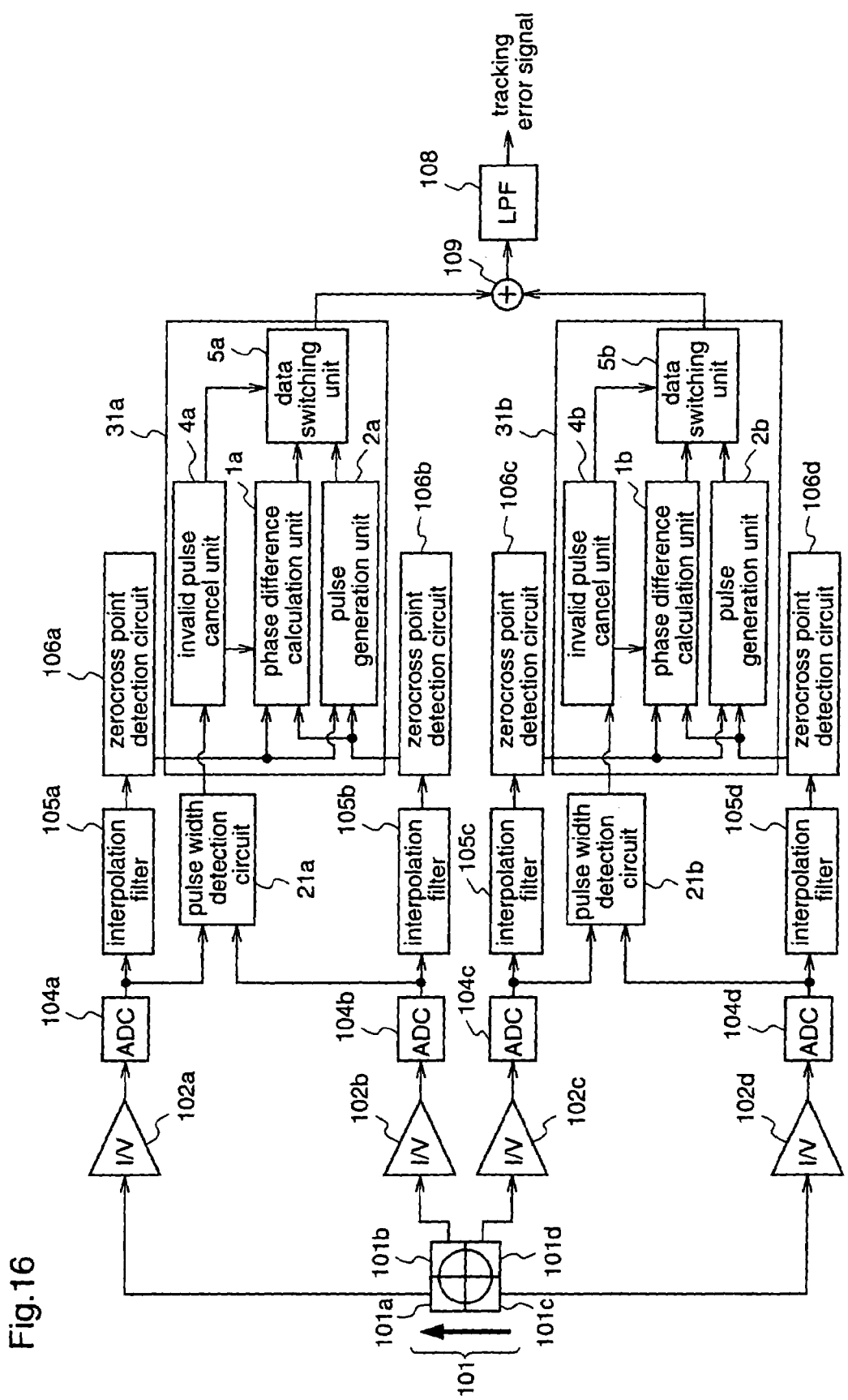
FIG. 16 is a block diagram illustrating a tracking error detection apparatus according to an eighth embodiment of the present invention.

FIG. 16 is a block diagram illustrating an example of a tracking error detection apparatus according to the eighth embodiment.

In the tracking error detection apparatus according to the eighth embodiment, the pulse width detection circuit 21 and the phase difference detection circuit 31 according to the third embodiment shown in FIG. 7 are provided for the two sequences of digital signals obtained from the photoreceptors that are positioned forward in the information track advancing direction, and for the two sequences of digital signals obtained from the photoreceptors positioned backward in the direction, respectively.

Thereby, even when the amplitude of the analog signal inputted to the first to fourth ADCs 104a to 104d is not sufficiently obtained due to a defect or the like, an accurate tracking error signal can be obtained. Further, no offset that depends on the depth of pit carved in the disc occurs, thereby producing an accurate tracking error signal.

Embodiment 9

Next, a tracking error detection apparatus according to a ninth embodiment of the present invention will be described.

Figure 17:
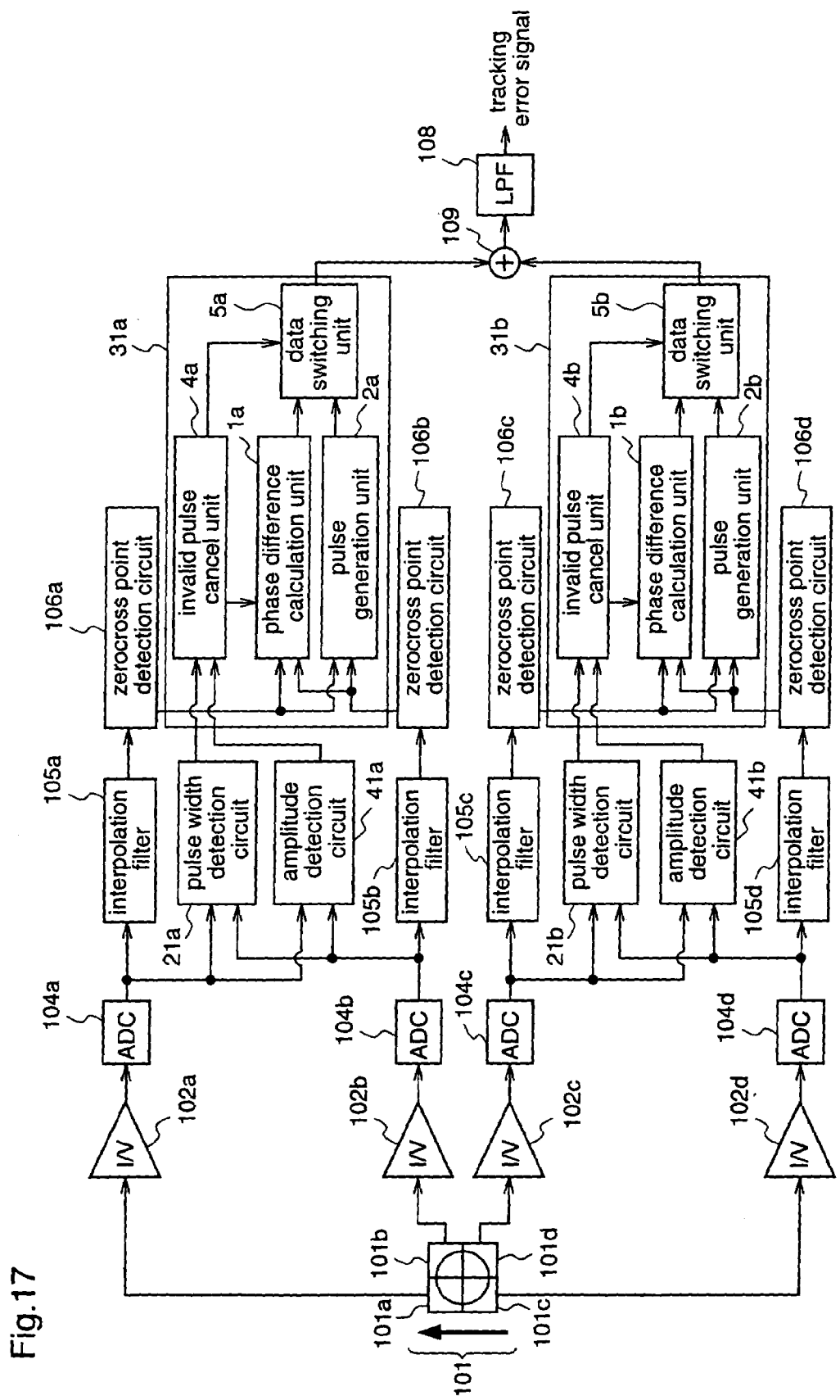
FIG. 17 is a block diagram illustrating a tracking error detection apparatus according to a ninth embodiment of the present invention.

FIG. 17 is a block diagram illustrating an example of a tracking error detection apparatus according to the ninth embodiment.

In the tracking error detection apparatus according to the ninth embodiment, the pulse width detection circuit 21, the phase difference detection circuit 31, and the amplitude detection circuit 41 according to the fourth embodiment shown in FIG. 9 are provided for the two sequences of digital signals obtained from the photoreceptors that are positioned forward in the information track advancing direction, and for the two sequences of digital signals obtained from the photoreceptors positioned backward in the direction, respectively.

Therefore, when the two sequences of digital signals are in the favorable amplitude states where it is not necessary to cancel the invalid pulse, phase comparison of these signals can be carried out without operating the invalid pulse cancel unit 4, whereby more information of phase comparison results can be obtained from the phase difference detection circuits 31a and 31b. As a result, accuracy of the tracking error signal generated by the tracking error detection apparatus is increased, and no offset that depends on the depth of the pit carved in the disc occurs, resulting in an accurate tracking error signal.

Embodiment 10

Next, a tracking error detection apparatus according to a tenth aspect of the present invention will be described.

Figure 18:
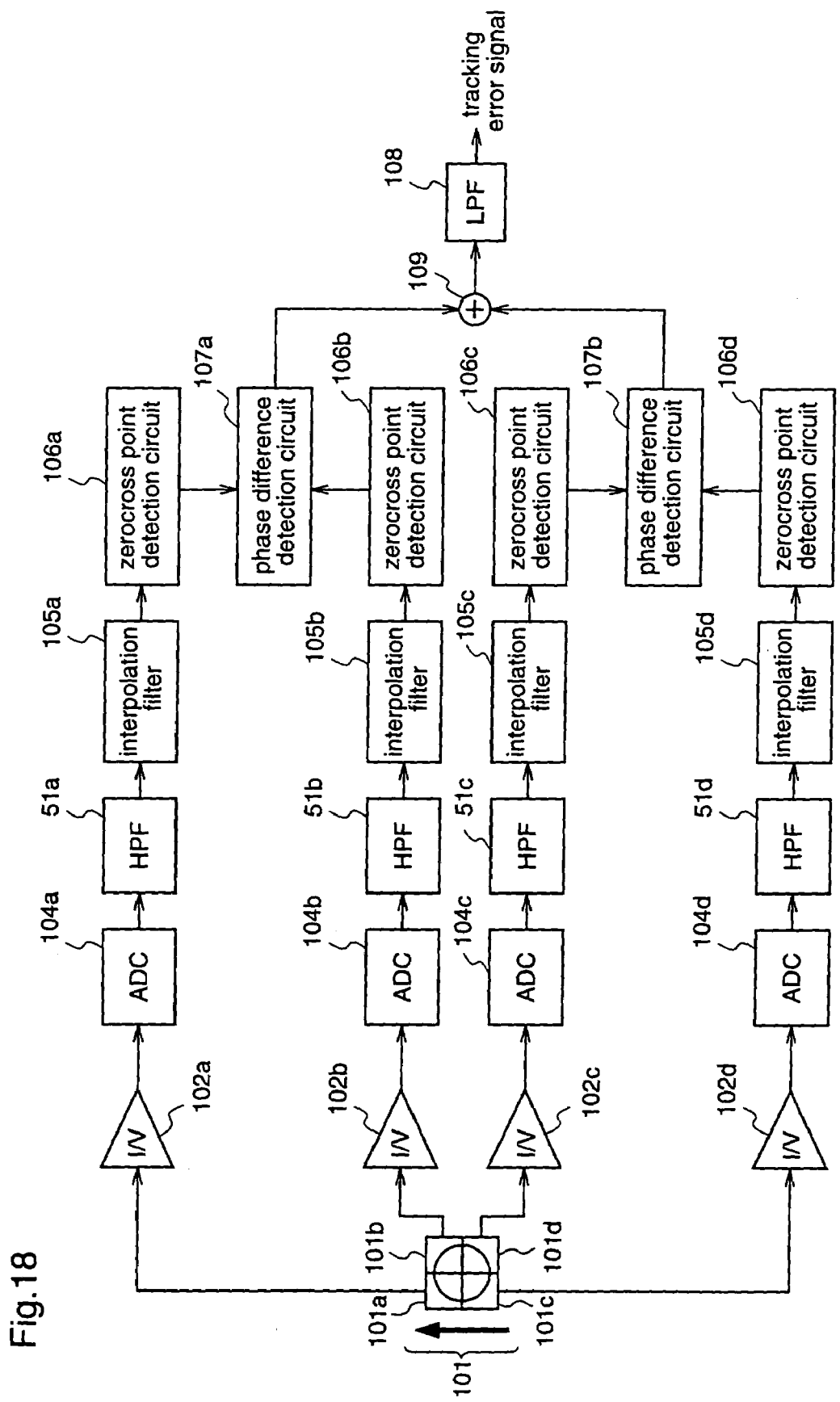
FIG. 18 is a block diagram illustrating a tracking error detection apparatus according to a tenth embodiment of the present invention.

FIG. 18 is a block diagram illustrating an example of a tracking error detection apparatus according to the tenth embodiment.

In the tracking error detection apparatus according to the tenth embodiment, the first and second HPFs 51a and 51b and the phase difference detection circuit 107 according to the fifth embodiment shown in FIG. 11 are provided for the two sequences of digital signals obtained from the photoreceptors that are positioned forward in the information track advancing direction, and for the two sequences of digital signals obtained from the photoreceptors positioned backward in the direction, respectively.

Therefore, the first to fourth zerocross point detection circuits 106a to 106d can correctly detect zerocross points, whereby a tracking error signal can be correctly detected even when the voltage level varies due to a defect or the like. Further, no offset that depends on the depth of the pit carved in the disc occurs, thereby producing an accurate tracking error signal.

The tracking error detection apparatus according to the present invention can detect an accurate tracking error signal even when a disc is played with a CAV or a flaw or the like exist on the disc to be played, and therefore, it is useful as a technique for performing accurate tracking control.

What is claimed is:

1. A tracking error detection apparatus comprising:
a photodetector comprising four photoreceptor elements which are partitioned along a tangential direction and a perpendicular direction with respect to an information track that is recorded as an information pit line on a recording medium;
zerocross detection circuits for detecting zerocross points at which two digital signals intersect center levels of the respective digital signals, each of said two digital signals being obtained by adding output signals from the two photoreceptor elements positioned on a diagonal line, among four signals that are generated according to the amounts of received by the respective photoreceptor elements and are outputted from the photodetector;
a phase difference detection circuit for performing phase comparison based on a distance between the zerocross points of the two digital signals, and outputting a result of phase comparison obtained between the respective zerocross points as a pulse signal having a pulse width corresponding to one period of a sampling clock; and
a low-pass filter for performing band restriction to a signal outputted from the phase difference detection circuit to obtain a tracking error signal.

2. A tracking error detection apparatus as defined in claim 1 wherein said phase difference detection circuit comprises:
a phase difference calculation unit for calculating a distance between the zerocross points of the two digital signals, and successively outputting the distance as a result of phase comparison;
a pulse generation unit for generating pulse signals each corresponding to one sampling clock at positions where the two digital signals perform zerocross, and outputting a phase comparison end pulse based on the generated pulse signals; and
a data switching unit for outputting each of the results of phase comparison between the respective zerocross points, which have been successively outputted from the phase difference calculation unit, as a pulse signal corresponding to one sampling clock, at the timing of the phase comparison end pulses outputted from the pulse generation unit.

3. A tracking error detection apparatus comprising:
a photodetector comprising four photoreceptor elements which are partitioned along a tangential direction and a perpendicular direction with respect to an information track that is recorded as an information pit line on a recording medium;
zerocross detection circuits for detecting zerocross points at which two digital signals intersect center levels of the respective digital signals, each of said two digital signals being obtained by adding output signals from the two photoreceptor elements positioned on a diagonal line, among four signals that are generated according to the amounts of light received by the respective photoreceptor elements and are outputted from the photodetector;

a pulse width detection circuit for detecting a pulse width of sampling data of the two digital signals;

a phase difference detection circuit for performing phase comparison using the distance between the zerocross points of the two digital signals, and outputting a result of phase comparison; and a low-pass filter for performing band restriction to a signal outputted from the phase difference detection circuit to obtain a tracking error signal;

wherein, when the pulse width detected by the pulse width detection circuit is equal to or shorter than a predetermined value, said phase difference detection circuit does not perform phase comparison at this pulse.

4. A tracking error detection apparatus as defined in claim 3 wherein said phase difference detection circuit comprises:

a phase difference calculation unit for calculating a distance between the zerocross points of the two digital signals, and successively outputting the distance as a result of phase comparison;

a pulse generation unit for generating pulse signals each corresponding to one sampling clock at positions where the two sequences of digital signals perform zerocross, and outputting a phase comparison end pulse based on the generated pulse signals;

an invalid pulse cancel unit for, when the pulse width detected by the pulse width detection circuit is equal to or shorter than a predetermined value, treating the corresponding pulse as an invalid pulse, and canceling phase comparison at this invalid pulse in the phase difference calculation unit; and a data updation unit for updating output data based on the result of phase comparison that is successively outputted from the phase difference calculation unit, at every phase comparison end pulse outputted from the pulse generation unit, and maintaining an output level of the output data until the next phase comparison end pulse arrives.

5. A tracking error detection apparatus as defined in claim 3 wherein said phase difference detection circuit comprises:

a phase difference calculation unit for calculating a distance between the zerocross points of the two digital signals, and successively outputting the distance as a result of phase comparison;

a pulse generation unit for generating pulse signals each corresponding to one sampling clock at positions where the two digital signals perform zerocross, and outputting a phase comparison end pulse, based on the generated pulse signals;

an invalid pulse cancel unit for, when the pulse width detected by the pulse width detection circuit is equal to or shorter than a predetermined value, treating the corresponding pulse as an invalid pulse, and canceling phase comparison at this invalid pulse in the phase difference calculation unit; and a data updation unit for
updating output data based on the result of phase comparison that is successively outputted from the phase difference calculation unit for every phase comparison end pulse outputted from the pulse generation unit, and maintaining an output level of the output data until the next phase comparison end pulse arrives, and updating the output data using the average of the plural results of phase difference comparison that are obtained in the phase difference calculation unit before and/or after the invalid pulse, at the timing of the invalid pulse, when receiving a signal from the invalid pulse cancel unit indicating that the invalid pulse is canceled in the phase difference calculation unit.

6. A tracking error detection apparatus as defined in claim 3 wherein said phase difference detection circuit comprises:

a phase difference calculation unit for calculating a distance between the zerocross points of the two digital signals, and successively outputting the distance as a result of phase comparison;

a pulse generation unit for generating pulse signals each corresponding to one sampling clock at positions where the two digital signals perform zerocross, and outputting a phase comparison end pulse based on the generated pulse signals;

an invalid pulse cancel unit for, when the pulse width detected by the pulse width detection circuit is equal to or shorter than a predetermined value, treating the corresponding pulse as an invalid pulse, and canceling phase comparison at this invalid pulse in the phase difference calculation unit; and a data switching unit for
outputting each of the results of phase comparison between the respective zerocross points, which have been successively outputted from the phase difference calculation unit, as a pulse signal corresponding to one sampling clock, at the timing of the phase comparison end pulse outputted from the pulse generation unit, and outputting the previous result of phase difference comparison obtained in the phase difference calculation unit, as a pulse signal corresponding to one sampling clock, at the timing of the invalid pulse, when receiving a signal indicating that the invalid pulse is canceled in the phase difference calculation unit.

7. A tracking error detection apparatus as defined in claim 3 wherein said phase difference detection circuit comprises:

a phase difference calculation unit for calculating a distance between the zerocross points of the two digital signals, and successively outputting the distance as a result of phase comparison;

a pulse generation unit for generating pulse signals each corresponding to one sampling clock at positions where the two sequences of digital signals perform zerocross, and outputting a phase comparison end pulse based on the generated pulse signals;

an invalid pulse cancel unit for, when the pulse width detected by the pulse width detection circuit is equal to or shorter than a predetermined value, treating the corresponding pulse as an invalid pulse, and canceling phase comparison at invalid pulse in the phase difference calculation unit; and a data switching unit for
outputting each of the results of phase comparison between the zerocross points, which have been successively outputted from the phase difference calculation unit, as a pulse signal corresponding to one sampling clock, at the timing of the phase comparison end pulse outputted from the pulse generation unit, and outputting the average of the plural results of phase difference comparison obtained before and/or after the invalid pulse in the phase difference calculation unit, as a pulse signal corresponding to one sampling clock, at the timing of the invalid pulse, when receiving a signal from the invalid pulse cancel unit indicating that the invalid pulse is canceled in the phase difference calculation unit.

8. A tracking error detection apparatus as defined in claim 4 wherein, when an H-side pulse width and/or an L-side pulse width, which are detected by the pulse width detection circuit, are/is equal to or shorter than a predetermined value, said invalid pulse cancel unit treats the corresponding pulse as an invalid pulse, and cancels phase comparison with this invalid pulse in the phase difference calculation unit.

9. A tracking error detection apparatus as defined in claim 4 further comprising an amplitude detection circuit for detecting envelope signals of the two digital signals, and operating the invalid pulse cancel unit only when the values of the envelope signals are equal to or lower than a predetermined threshold value.

10. A tracking error detection apparatus as defined in claim 1 further comprising high-pass filters for removing frequencies equal to and lower than predetermined cutoff frequencies of the two sequences of digital signals.

11. A tracking error detection apparatus comprising:
a photodetector comprising four photoreceptor elements which are partitioned along a tangential direction and a perpendicular direction with respect to an information track that is recorded as an information pit line on a recording medium;
high-pass filters for removing frequencies equal to and lower than predetermined cutoff frequencies of two digital signals, respectively, said two digital signals being obtained by adding the output signals from two photoreceptor elements positioned on a diagonal line, among four signals that are generated according to the amounts of light received by the respective photoreceptor elements and are outputted from the photodetector;
zerocross detection circuits for detecting zerocross points at which the two digital signals intersect center levels of the respective digital signals, from the two digital signals in which the frequencies equal to and lower than the predetermined cutoff frequencies are removed;
a phase difference detection circuit for performing phase comparison using a distance between the zerocross points of the two digital signals, and outputting a result of phase comparison; and
a low-pass filter for performing band restriction to a signal outputted from the phase difference detection circuit to obtain a tracking error signal.

12. A tracking error detection apparatus comprising:
a photodetector comprising four photoreceptor elements which are partitioned along a tangential direction and a perpendicular direction with respect to an information track that is recorded as an information pit line on a recording medium;
zerocross detection circuits for detecting zerocross points at which four digital signals intersect center levels of the respective digital signals, said four digital signals being generated according to the amounts of light received by the respective photoreceptor elements and are outputted from the photodetector;
a first phase difference detection circuit for performing phase comparison based on a distance between the zerocross points of two digital signals that are obtained from the photoreceptor elements positioned forward in the advancing direction of the information track, among the zerocross points of the four digital signals, and outputting a result of phase comparison between the zerocross point, as a pulse signal corresponding to one sampling clock;
a second phase difference detection circuit for performing phase comparison using a distance between the zerocross points of photoreceptor elements positioned backward in the advancing direction of the information track, among the zerocross points of the four digital signals, and outputting the result of phase comparison between the zerocross points, as a pulse signal corresponding to one sampling clock;
an addition circuit for adding the output signals of the first and second phase difference detection circuits; and
a low-pass filter for performing band restriction to a signal outputted from the addition circuit to obtain a tracking error signal.

13. A tracking error detection apparatus as defined in claim 12 wherein each of said first and second phase difference detection circuits comprises:
a phase difference calculation unit for calculating a distance between the zerocross points of the two digital signals, and successively outputting the distance as a result of phase comparison;
a pulse generation unit for generating pulse signals each corresponding to one sampling clock at positions where the two digital signals perform zerocross, and outputting a phase comparison end pulse based on the generated pulse signals; and
a data switching unit for outputting each of the results of phase comparison between the zerocross points, which have been successively outputted from the phase difference calculation unit, as a pulse signal corresponding to one sampling clock, at the timing of the phase comparison end pulse outputted from the pulse generation unit.

14. A tracking error detection apparatus comprising:
a photodetector comprising four photoreceptor elements which are partitioned along a tangential direction and a perpendicular direction with respect to an information track that is recorded as an information pit line on a recording medium;
zerocross detection circuits for detecting zerocross points at which four digital signals intersect center levels of the respective digital signals, said four digital signals being generated according to the amounts of light received by the respective photoreceptor elements and are outputted from the photodetector;
a first pulse width detection circuit for detecting pulse widths of sampling data of two digital signals that are obtained from the photoreceptor elements placed forward in the advancing direction of the information track, among the four digital signals;
a second pulse width detection circuit for detecting pulse widths of sampling data of two digital signals that are obtained from the photoreceptor elements placed backward in the advancing direction of the information track, among the four digital signals;
a first phase difference detection circuit for performing phase comparison based on a distance between the zerocross points of the two digital signals that are obtained from the photoreceptor elements positioned forward in the advancing direction of the information track, among the zerocross points of the four digital signals, and outputting the result of phase comparison between the zerocross points, as a pulse signal corresponding to one sampling clock;

a second phase difference detection circuit for performing phase comparison based on a distance between the zerocross points of the two digital signals that are obtained from the photoreceptor elements positioned backward in the advancing direction of the information track, among the zerocross points of the four digital signals, and outputting the result of phase comparison between the zerocross points, as a pulse signal corresponding to one sampling clock;

an addition circuit for adding the output signals of the first and second phase difference detection circuits; and a low-pass filter for performing band restriction to a signal outputted from the addition circuit to obtain a tracking error signal;

wherein, when the pulse width detected by the first pulse width detection circuit is equal to or lower than a predetermined value, the first phase difference detection circuit does not perform phase comparison at the detected pulse, and when the pulse width detected by the second pulse width detection circuit is equal to or lower than a predetermined value, the second phase difference detection circuit does not perform phase comparison at the detected pulse.

15. A tracking error detection apparatus as defined in claim 14 wherein each of said first and second phase difference detection circuits comprises:

a phase difference calculation unit for calculating a distance between the zerocross points of the two digital signals, and successively outputting the distance as a result of phase comparison;

a pulse generation unit for generating pulse signals each corresponding to one sampling clock at positions where the two digital signals perform zerocross, and outputting a phase comparison end pulse based on the generated pulse signals;

an invalid pulse cancel unit for, when the pulse width detected by the first or second pulse width detection circuit is equal to or shorter than a predetermined value, treating the corresponding pulse as an invalid pulse, and canceling phase comparison at this invalid pulse in the phase difference calculation unit; and a data updation unit for updating output data using the result of phase comparison that is successively outputted from the phase difference calculation unit, at every phase comparison end pulse outputted from the pulse generation unit, and maintaining an output level of the output data until the next phase comparison end pulse arrives.

16. A tracking error detection apparatus as defined in claim 14 wherein each of said first and second phase difference detection circuits comprises:

a phase difference calculation unit for calculating a distance between the zerocross points of the two digital signals, and successively outputting the distance as a result of phase comparison;

a pulse generation unit for generating pulse signals each corresponding to one sampling clock at positions where the two digital signals perform zerocross, and outputting a phase comparison end pulse based on the generated pulse signals;

an invalid pulse cancel unit for, when the pulse width detected by the first or second pulse width detection circuit is equal to or shorter than a predetermined value, treating the corresponding pulse as an invalid pulse, and canceling phase comparison at this invalid pulse in the phase difference calculation unit; and a data updation unit for
updating output data using the result of phase comparison that is successively outputted from the phase difference calculation unit for every phase comparison end pulse outputted from the pulse generation unit, and maintaining the output level of the output data until the next phase comparison end pulse arrives, and updating the output data using the average of the plural results of phase difference comparison that are obtained in the phase difference calculation unit before and/or after the invalid pulse, at the timing of the invalid pulse, when receiving a signal from the invalid pulse cancel unit indicating that the invalid pulse is canceled in the phase difference calculation unit.

17. A tracking error detection apparatus as defined in claim 14 wherein each of said first and second phase difference detection circuits comprises:

a phase difference calculation unit for calculating the distance between the zerocross points of the two digital signals, and successively outputting the distance as a result of phase comparison;

a pulse generation unit for generating pulse signals each corresponding to one sampling clock at positions where the two digital signals perform zerocross, and outputting a phase comparison end pulse based on the generated pulse signals;

an invalid pulse cancel unit for, when the pulse width detected by the first or second pulse width detection circuit is equal to or shorter than a predetermined value, treating the corresponding pulse as an invalid pulse, and canceling phase comparison at this invalid pulse in the phase difference calculation unit; and a data switching unit for
outputting the result of phase comparison that is successively outputted from the phase difference calculation unit, as a pulse signal corresponding to one sampling clock, at the timing of the phase comparison end pulse outputted from the pulse generation unit, and outputting the previous result of phase difference comparison obtained in the phase difference calculation unit, as a pulse signal corresponding to one sampling clock, at the timing of the invalid pulse, when receiving a signal indicating that the invalid pulse is canceled in the phase difference calculation unit.

18. A tracking error detection apparatus as defined in claim 14 wherein each of said first and second phase difference detection circuit comprises:

a phase difference calculation unit for calculating a distance between the zerocross points of the two digital signals, and successively outputting the distance as a result of phase comparison;

a pulse generation unit for generating pulse signals each corresponding to one sampling clock at positions where the two digital signals perform zerocross, and outputting a phase comparison end pulse based on the generated pulse signals;

an invalid pulse cancel unit for, when the pulse width detected by the first or second pulse width detection circuit is equal to or shorter than a predetermined value, treating the corresponding pulse as an invalid pulse, and canceling phase comparison at this invalid pulse in the phase difference calculation unit; and a data switching unit for
  outputting the result of phase comparison between the respective zerocross points, which have been successively outputted from the phase difference calculation unit, as a pulse signal corresponding to one sampling clock, at the timing of the phase comparison end pulse outputted from the pulse generation unit, and
  outputting the average of the plural results of phase difference comparison which are obtained before and/or after the invalid pulse in the phase difference calculation unit, as a pulse signal corresponding to one sampling clock, at the timing of the invalid pulse, when receiving a signal from the invalid pulse cancel unit indicating that the invalid pulse is canceled in the phase difference calculation unit.

19. A tracking error detection apparatus as defined in claim 15 wherein,
  when an H-side pulse width and/or an L-side pulse width, which are detected by the first or second pulse width detection circuit, are/is equal to or shorter than a predetermined value, said invalid pulse cancel unit treats the corresponding pulse as an invalid pulse, and cancels phase comparison with this invalid pulse in the phase difference calculation unit.

20. A tracking error detection apparatus as defined in claim 15 further comprising:
  a first amplitude detection circuit for detecting envelope signals of the two digital signals which are obtained from the photoreceptor elements positioned forward in the advancing direction of the information track, among the four digital signals, and operating the invalid pulse cancel unit only when the values of the envelope signals are equal to or lower than a predetermined threshold value; and
  a second amplitude detection circuit for detecting envelope signals of the two digital signals which are obtained from the photoreceptor elements positioned backward in the advancing direction of the information track, among the four digital signals, and operating the invalid pulse cancel unit only when the values of the envelope signals are equal to or lower than a predetermined threshold value.

21. A tracking error detection apparatus as defined in claim 12 further comprising high-pass filters for removing frequencies equal to and lower than predetermined cutoff frequencies of the four digital signals.

22. A tracking error detection apparatus comprising:
  a photodetector comprising four photoreceptor elements which are partitioned along a tangential direction and a perpendicular direction with respect to an information track that is recorded as an information pit line on a recording medium;
  high-pass filters for removing frequencies equal to and lower than predetermined cutoff frequencies of four digital signals obtained according to the amounts of light received by the respective photoreceptor elements and are outputted from the photodetector;
  zerocross detection circuits for detecting zerocross points at which the four digital signals intersect center levels of the respective digital signals, from the four digital signals in which the frequencies equal to and lower than the predetermined cutoff frequencies are removed;
  a first phase difference detection circuit for performing phase comparison based on the distance between the zerocross points of the two digital signals obtained from the photoreceptor elements positioned forward in the advancing direction of the information track, among the zerocross points of the four digital signals, and outputting a result of phase comparison;
  a second phase difference detection circuit for performing phase comparison based on the distance between the zerocross points of the two digital signals obtained from the photoreceptor elements positioned backward in the advancing direction of the information track, among the zerocross points of the four digital signals, and outputting a result of phase comparison;
  an addition circuit for adding the output signals from the first and second phase difference detection circuits; and
  a low-pass filter for performing band restriction to a signal outputted from the phase difference detection circuit to obtain a tracking error signal.

23. A tracking error detection apparatus as defined in claim 3 further comprising high-pass filters for removing frequencies equal to and lower than predetermined cutoff frequencies of the two digital signals.

24. A tracking error detection apparatus as defined in claim 14 further comprising high-pass filters for removing frequencies equal to and lower than predetermined cutoff frequencies of the four digital signals.

25. A tracking error detection apparatus as defined in claim 5 wherein, when an H-side pulse width and/or an L-side pulse width, which are detected by the pulse width detection circuit, are/is equal to or shorter than a predetermined value, said invalid pulse cancel unit treats the corresponding pulse as an invalid pulse, and cancels phase comparison with this invalid pulse in the phase difference calculation unit.

26. A tracking error detection apparatus as defined in claim 6 wherein, when an H-side pulse width and/or an L-side pulse width, which are detected by the pulse width detection circuit, are/is equal to or shorter than a predetermined value, said invalid pulse cancel unit treats the corresponding pulse as an invalid pulse, and cancels phase comparison with this invalid pulse in the phase difference calculation unit.

27. A tracking error detection apparatus as defined in claim 7 wherein, when an H-side pulse width and/or an L-side pulse width, which are detected by the pulse width detection circuit, are/is equal to or shorter than a predetermined value, said invalid pulse cancel unit treats the corresponding pulse as an invalid pulse, and cancels phase comparison with this invalid pulse in the phase difference calculation unit.

28. A tracking error detection apparatus as defined in claim 5 further comprising an amplitude detection circuit for detecting envelope signals of the two digital signals, and operating the invalid pulse cancel unit only when the values of the envelope signals are equal to or lower than a predetermined threshold value.

29. A tracking error detection apparatus as defined in claim 6 further comprising an amplitude detection circuit for detecting envelope signals of the two digital signals, and operating the invalid pulse cancel unit only when the values of the envelope signals are equal to or lower than a predetermined threshold value.

30. A tracking error detection apparatus as defined in claim 7 further comprising an amplitude detection circuit for detecting envelope signals of the two digital signals, and operating the invalid pulse cancel unit only when the values of the envelope signals are equal to or lower than a predetermined threshold value.

31. A tracking error detection apparatus as defined in claim 16 wherein, when an H-side pulse width and/or an L-side pulse width, which are detected by the first or second pulse width detection circuit, are/is equal to or shorter than a predetermined value, said invalid pulse cancel unit treats the corresponding pulse as an invalid pulse, and cancels phase comparison with this invalid pulse in the phase difference calculation unit.

32. A tracking error detection apparatus as defined in claim 17 wherein, when an H-side pulse width and/or an L-side pulse width, which are detected by the first or second pulse width detection circuit, are/is equal to or shorter than a predetermined value, said invalid pulse cancel unit treats the corresponding pulse as an invalid pulse, and cancels phase comparison with this invalid pulse in the phase difference calculation unit.

33. A tracking error detection apparatus as defined in claim 18 wherein, when an H-side pulse width and/or an L-side pulse width, which are detected by the first or second pulse width detection circuit, are/is equal to or shorter than a predetermined value, said invalid pulse cancel unit treats the corresponding pulse as an invalid pulse, and cancels phase comparison with this invalid pulse in the phase difference calculation unit.

34. A tracking error detection apparatus as defined in claim 16 further comprising:

a first amplitude detection circuit for detecting envelope signals of the two digital signals which are obtained from the photoreceptor elements positioned forward in the advancing direction of the information track, among the four digital signals, and operating the invalid pulse cancel unit only when the values of the envelope signals are equal to or lower than a predetermined threshold value; and a second amplitude detection circuit for detecting envelope signals of the two digital signals which are obtained from the photoreceptor elements positioned backward in the advancing direction of the information track, among the four digital signals, and operating the invalid pulse cancel unit only when the values of the envelope signals are equal to or lower than a predetermined threshold value.

35. A tracking error detection apparatus as defined in claim 17 further comprising:

a first amplitude detection circuit for detecting envelope signals of the two digital signals which are obtained from the photoreceptor elements positioned forward in the advancing direction of the information track, among the four digital signals, and operating the invalid pulse cancel unit only when the values of the envelope signals are equal to or lower than a predetermined threshold value; and a second amplitude detection circuit for detecting envelope signals of the two digital signals which are obtained from the photoreceptor elements positioned backward in the advancing direction of the information track, among the four digital signals, and operating the invalid pulse cancel unit only when the values of the envelope signals are equal to or lower than a predetermined threshold value.

36. A tracking error detection apparatus as defined in claim 18 further comprising:

a first amplitude detection circuit for detecting envelope signals of the two digital signals which are obtained from the photoreceptor elements positioned forward in the advancing direction of the information track, among the four digital signals, and operating the invalid pulse cancel unit only when the values of the envelope signals are equal to or lower than a predetermined threshold value; and a second amplitude detection circuit for detecting envelope signals of the two digital signals which are obtained from the photoreceptor elements positioned backward in the advancing direction of the information track, among the four digital signals, and operating the invalid pulse cancel unit only when the values of the envelope signals are equal to or lower than a predetermined threshold value.

* * * * *